(12) United States Patent
Fujimoto

(10) Patent No.: US 8,441,760 B2
(45) Date of Patent: May 14, 2013

(54) SUSPENSION FOR SUPPORTING A MAGNETIC HEAD SLIDER

(75) Inventor: Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 0 days.

(21) Appl. No.: 13/432,545

(22) Filed: Mar. 28, 2012

(65) Prior Publication Data

US 2012/0250191 A1 Oct. 4, 2012

(30) Foreign Application Priority Data

Mar. 28, 2011 (JP) .................................. 2011-069801
Jul. 29, 2011 (JP) .................................. 2011-166828

(51) Int. Cl.
*G11B 5/48* (2006.01)
*G11B 21/16* (2006.01)

(52) U.S. Cl.
USPC ..................................... 360/244.8; 360/244.9

(58) Field of Classification Search ............... 360/244.2, 360/244.8, 244.9, 245, 245.1
See application file for complete search history.

(56) References Cited

U.S. PATENT DOCUMENTS

| | | | | |
|---|---|---|---|---|
| 5,065,268 A | * | 11/1991 | Hagen ........................ | 360/244.8 |
| 6,046,884 A | * | 4/2000 | Crane ........................ | 360/244.2 |
| 6,271,996 B1 | * | 8/2001 | Houk et al. ................ | 360/244.9 |
| 6,388,842 B1 | * | 5/2002 | Murphy ..................... | 360/244.8 |
| 6,687,091 B1 | * | 2/2004 | Chen et al. ................. | 360/244.8 |
| 6,778,362 B1 | * | 8/2004 | Davis et al. ................ | 360/244.8 |
| 7,113,371 B1 | * | 9/2006 | Hanna et al. ............... | 360/244.8 |
| 7,333,299 B2 | * | 2/2008 | Wada et al. ................ | 360/294.7 |
| 7,688,550 B2 | * | 3/2010 | Tada et al. .................. | 360/244.9 |
| 7,787,217 B2 | * | 8/2010 | Mangold et al. ........... | 360/244.8 |
| 2012/0106005 A1 | * | 5/2012 | Fujimoto .................... | 360/234.6 |

FOREIGN PATENT DOCUMENTS

| | | |
|---|---|---|
| JP | 2005-032393 | 2/2005 |
| JP | 2008-021374 | 1/2008 |
| JP | 2009-295261 | 12/2009 |

* cited by examiner

*Primary Examiner* — Brian Miller
(74) *Attorney, Agent, or Firm* — Sterne, Kessler, Goldstein & Fox P.L.L.C.

(57) ABSTRACT

Provided that a distance between a distal edge of a supporting part and a dimple is represented by L1, a load beam part is bent around a first bending line within a center region away from the distal edge of the supporting part by more than or equal to 0.4*L1 and less than or equal to 0.6*L1 and also around a second bending line positioned closer to a proximal side in the suspension longitudinal direction than the first bending line. Paired leaf springs are bent around a third bending line. The second bending line is positioned within a proximal region within 0.22*L1 from the distal edge of the supporting part, and no paired flange portions exist at an area at which the second bending line is positioned.

10 Claims, 22 Drawing Sheets

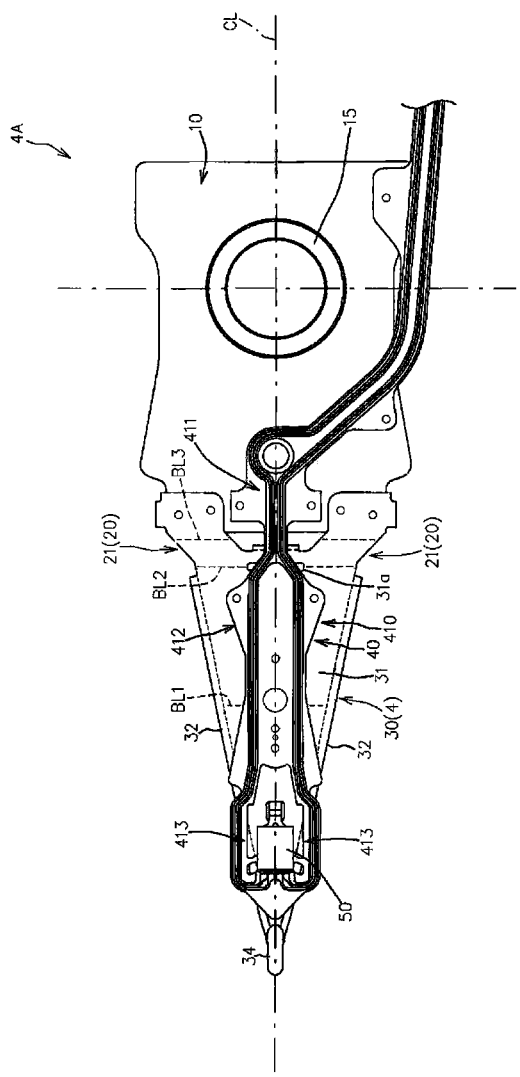

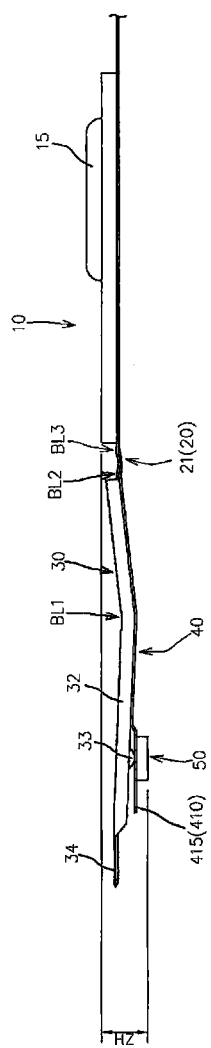

SUSPENSION FOR SUPPORTING A MAGNETIC HEAD SLIDER

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

A magnetic head suspension that supports a magnetic head slider is required to rapidly and accurately have the magnetic head slider positioned at a center of a target track.

More specifically, the magnetic head suspension is directly or indirectly connected at a proximal side to an actuator such as a voice coil motor and swung around a swing center by the actuator so as to move the magnetic head slider, which is supported at a distal side of the suspension, to the center of the target track along a seek direction parallel to a disk surface.

In order to rapidly have the magnetic head slider positioned at the target track, it is needed to raise frequency of a driving signal for the actuator.

Accordingly, in order to allow the magnetic head slider to be moved to the target track in a rapid and accurate manner, it is desirable to prevent occurrence of resonant vibration of the magnetic head suspension as much as possible at the time when having the magnetic head suspension swung around the swing center.

Each of Japanese Unexamined Patent Publication Nos. 2005-032393 and 2008-021374 discloses a magnetic head suspension with a load beam part that is provided with paired flange portions over substantially entire region with respect to a suspension longitudinal direction.

The paired flange portions are useful in enhancing rigidity while preventing mass from increasing, thereby effectively increasing a resonant frequency.

Japanese Unexamined Patent Publication No. 2009-295261 (hereinafter referred to as JP'261) discloses a magnetic head suspension having a following configuration with the aim of minimizing displacement amount (gain) of the magnetic head slider in the seek direction at the time when the magnetic head suspension is vibrated while realizing an effect of increasing the resonant frequency thanks to the paired flange portions provided at the load beam part. That is, the load beam part with the paired flange portions is bent around two bending lines including a distal-side bending line that is positioned at substantially center in the suspension longitudinal direction and extends along a suspension width direction, and a proximal-side bending line that is positioned closer to a proximal side in the suspension longitudinal direction than the distal-side bending line and extends along the suspension width direction.

More specifically, vibration modes that occur in the magnetic head suspension include a main resonance mode that vibrates in the seek direction, a bending mode that vibrates in z direction perpendicular to the disk surface, and a torsion mode that vibrates in a twisting manner around a suspension longitudinal center line.

When a vibration occurs in the magnetic head suspension, the magnetic head slider is displaced from the target track in accordance with a level of the vibration. A displacement amount (gain) of the magnetic head slider at the time when the suspension vibrates in the torsion mode can be minimized by bending the load beam part around a bending line along the suspension width direction and adjusting the bending angle at the bending line to an optimum value.

That is, bending of the load beam part with an optimum bending angle makes it possible to effectively prevent the magnetic head slider from being displaced from the target track even if the vibration of the torsion mode occurs in the magnetic head suspension.

The magnetic head suspension disclosed by JP'261 has been made in view of this point, and can minimize the gain of the magnetic head slider by setting the bending angles at the distal-side bending line and the proximal-side bending line to the respective optimum values while realizing the effect of increasing the resonant frequency thanks to the paired flange portions.

Although the magnetic head suspension disclosed by JP'261 can minimize the gains of the magnetic head slider with respect to the first and second torsion modes, the gain in the third torsion mode has not been taken into consideration.

More specifically, when the frequency of the driving signal for the actuator reaches a certain frequency (a first resonant frequency), a resonant vibration in the first torsion mode occurs in the magnetic head suspension.

In a case where the frequency of the driving signal is further raised beyond the first resonant frequency, upon reaching another certain frequency (a second resonant frequency), a resonant vibration in the second torsion mode occurs in the magnetic head suspension. In a case where the frequency of the driving signal is still further raised beyond the second resonant frequency, upon reaching still another certain frequency (a third resonant frequency), a resonant vibration in the third torsion mode occurs in the magnetic head suspension.

In particular, it is needed to raise the frequency of the driving signal for the actuator that drives the magnetic head slider in order to speed up the reading/writing action by the magnetic head slider, as explained earlier. Therefore, it is needed to take measures the vibration of the third torsion mode as well as the vibrations of the first and second torsion modes with respect to the displacement of the magnetic head slider due to the vibration of the torsion mode.

In view of this point, the magnetic head suspension disclosed by JP'261 leaves room for improvement.

JP'261 also discloses a magnetic head suspension according to a modified embodiment in which the paired flange portions are provided with cutouts or through holes at positions where the distal-side bending line and the proximal-side bending line are arranged.

The modified embodiment can facilitate the bending processes around the distal-side bending line and the proximal-side bending line in comparison with a configuration without the cutout or the through hole.

However, the modified embodiment remains a problem that the paired flange portions have to be deformed upon the bending processes around the distal-side bending line and the proximal-side bending line.

In particular, in order to make an amount in which the gain can be adjusted by means of the bending process around the proximal-side bending line same as an amount in which the gain can be adjusted by means of the bending process around the distal-side bending line, it is needed to make the bending angle at the proximal-side bending line, which is positioned closer to a proximal side in the suspension longitudinal direction than the distal-side bending line, larger than that at the distal-side bending line. As a result, there is a problem that the accurate bend process around the proximal-side bending line is made difficult.

More specifically, ranges in which the gain of the magnetic head slider can be adjusted by means of the bending processes around the distal-side bending line and the proximal-side bending line depend on displacement amounts resulted from the bending processes around the respective bending lines. The displacement amount means a displacement height which is a difference between height positions at which the magnetic head slider is positioned before and after the bending process is made, respectively.

Assuming that a displacement height "H" is achieved by bending the load beam part around the distal-side bending line, which is positioned at a substantially center in the suspension longitudinal direction, with a bending angle "A", it is needed to bend the load beam part, which is positioned closer to a proximal side in the suspension longitudinal direction than the distal-side bending line, with a bending angle larger than the bending angle "A" in order to achieve the same displacement height "H" by means of the bending process around the proximal side bending line. Bending the load beam part with the larger angle causes the paired flange portions to be largely deformed.

SUMMARY OF THE INVENTION

The present invention has been made in view of the above conventional art, and it is an object thereof to provide a magnetic head suspension including a load beam part with paired flange portions for increasing a resonant frequency, the suspension capable of minimizing a displacement amount of a magnetic head slider in a seek direction at a time of vibrations in the first to third torsion modes by adjusting bending angles at first and second bending lines arranged in the load beam part and also adjusting a position in the suspension longitudinal direction of a third bending line arranged in paired leaf springs configuring a load bending part without deteriorating the effect that the resonant frequency can be increased by the paired flange portions, and also capable of facilitating the bending processes at the first and second bending lines.

In order to achieve the object, the present invention provides a magnetic head suspension including a supporting part that is swung around a swing center in a seek direction parallel to a disk surface directly or indirectly by an actuator, a load bending part including paired right and left leaf springs that are connected at proximal portions to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface and formed with a dimple that protrudes in a direction toward the disk surface so as to be brought into contact with a rear surface of the head-mounting region that is opposite from a supporting surface at which the magnetic head slider is supported, the paired flange portions being bent from both side edges of the main body portion in a suspension width direction and existing at least in a region that is positioned closer to a distal side in the suspension longitudinal direction than a proximal region that is within 0.22*L1 from the distal edge of the supporting part provided that a distance in the suspension longitudinal direction between the distal edge and the dimple is represented by L1, wherein the load beam part is bent around two bending lines including a first bending line that is along the suspension width direction and is positioned within a center region away from the distal edge of the supporting part by more than or equal to 0.4*L1 and less than or equal to 0.6*L1 and a second bending line that is along the suspension width direction and is positioned closer to a proximal side in the suspension longitudinal direction than the first bending line, wherein the paired leaf springs are bent around a third bending line that is along the suspension width direction and is positioned between proximal edges connected to the supporting part and distal edges connected to the load beam part, and wherein the second bending line is positioned within the proximal region of the load beam part, and the paired flange portions do not exist at an area at which the second bending line is positioned.

In the magnetic head suspension according to the present invention, the load beam part is provided with the paired right and left Lange portions in such a manner as that they exist at least in the region that is positioned closer to a distal side in the suspension longitudinal direction than the proximal region that is within 0.22*L1 from the distal edge of the supporting part. The load beam part is bent around the first bending line that is positioned within the center region away from the distal edge of the supporting part by more than or equal to 0.4*L1 and less than or equal to 0.6*L1 and also around the second bending line that is positioned closer to the proximal side in the suspension longitudinal direction than the first bending line. Furthermore, the paired leaf springs are bent around the third bending line between the proximal edges connected to the supporting part and the distal edges connected to the load beam part.

The thus configured magnetic head suspension makes it possible to minimize the displacement amounts (gains) of the magnetic head slider in the seek direction at the time of the vibrations in the first to third torsion modes by adjusting the bending angles at the first and second bending lines to the respective optimal values as well as adjusting the position in the suspension longitudinal direction of the third bending line to the optimal value.

Furthermore, since the first bending line is positioned within the center region, it is possible to enlarge a range in which the gain can be adjusted with a small bending angle.

Furthermore, in the magnetic head suspension according to the present invention, the second bending line is positioned within the proximal region of the load beam part, and the paired flange portions does not exist at an area at which the second bending line is positioned.

The configuration allows the bending angle at the second bending line to be easily increased without deteriorating the effect of increasing the resonant frequency thanks to the paired flange portion. Accordingly, it is possible to easily make a range in which the gain can be adjusted by the bending process at the second bending line coincident with a range in which the gain can be adjusted by the bending process at the first bending line by setting the bending angle at the second bending line larger than that at the first bending line arranged within the center region, for example.

In one embodiment, the load beam part may be configured so as not to have the paired flange portions within the proximal region.

In a preferable embodiment, the load beam part includes paired right and left width-expanded portions that are positioned closer to the proximal side in the suspension longitudinal direction than the second bending line and extend outward from the main body portion in the suspension width direction.

In another embodiment, the paired flange portions may include distal-side flange portions arranged in a region closer to the distal side in the suspension longitudinal direction than the proximal region and proximal-side flange portions arranged in a region closer to the proximal side in the suspension longitudinal direction than the second bending line.

In any one of the above-mentioned various configurations, the main body portion preferably may include a bending-facilitated structure on the second bending line.

The magnetic head suspension according to any one of the above-mentioned various configurations preferably may include a damper fixed to a surface of the main body portion that is opposite from the disk surface.

The damper is arranged so as to extend from a position that is closer to the proximal side in the suspension longitudinal direction than the first bending line until a position that is closer to the proximal side in the suspension longitudinal direction than the second bending line.

Provided that a length in the suspension longitudinal direction between the distal edge of the supporting part and the proximal edges of the paired flange portions is represented by L2 and a length in the suspension longitudinal direction between the distal edge of the supporting part and the second bending line is represented by D2, the second bending line may be preferably positioned so as to satisfy a condition of $0.7*L2 \leqq D2 \leqq 1.0*L2$.

In a more preferable configuration, the second bending line may be positioned so as to satisfy a condition of $D2=L2$.

In any one of the above-mentioned various configurations, the main body portion and the flexure part may be overlapped with each other in such a manner as that, out of the main body portion, an area that is disposed at the same position as the second bending line in the suspension longitudinal direction includes an overlapped area that is overlapped with the flexure part and a non-overlapped area that is not overlapped with the flexure part.

In this case, the overlapped area may be preferably formed with a through hole penetrating in a direction orthogonal to the disk surface so that the second bending line is arranged only at the non-overlapped area.

Any one of the above-mentioned magnetic head suspensions may be preferably bent at the first bending line so as to be convex toward the disk surface, and also bent at the second and third bending lines so as to be convex toward a direction opposite from the disk surface.

BRIEF DESCRIPTION OF THE DRAWINGS

FIG. 14 is a bottom view of the magnetic head suspension according to the fourth embodiment.

FIG. 16 is a side view of the magnetic head suspension according to the example B.

DETAILED DESCRIPTION OF THE PREFERRED EMBODIMENTS

First Embodiment

Hereinafter, a preferred embodiment of a magnetic head suspension according to the present invention will be described, with reference to the attached drawings.

Figure 1:
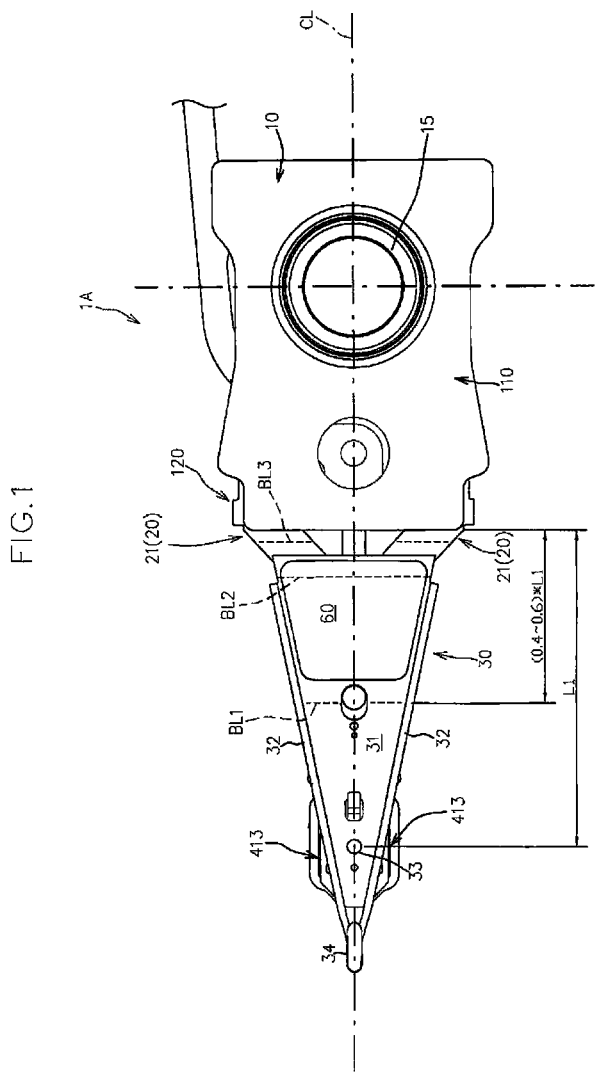
FIG. 1 is a top view of a magnetic head suspension according to a first embodiment of the present invention.
Figure 2:
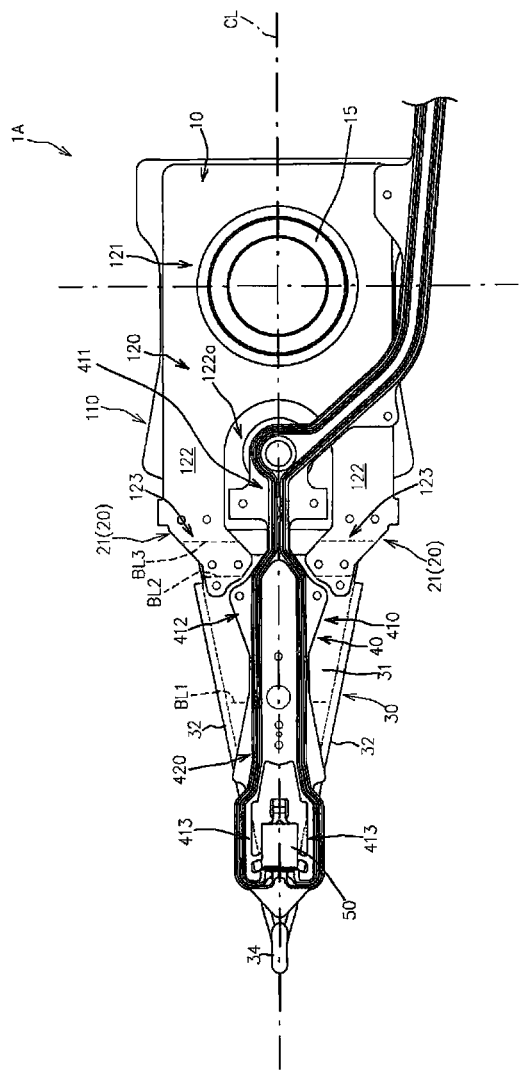
FIG. 2 is a bottom view of the magnetic head suspension according to the first embodiment.
Figure 3:
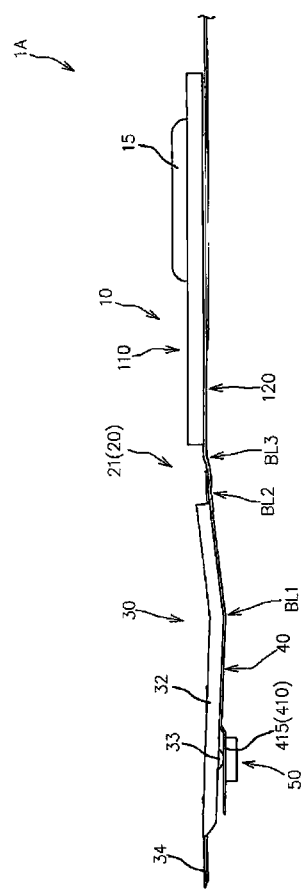
FIG. 3 is a side view of the magnetic head suspension according to the first embodiment.

FIGS. 1 to 3 are a top view (a plan view as viewed from a side opposite from a disk surface), a bottom view (a bottom plan view as viewed from a side close to the disk surface) and a side view of a magnetic head suspension 1A according to the present embodiment, respectively.

FIG. 2 indicates welding points with using small circles.

As shown in FIGS. 1 to 3, the magnetic head suspension 1A includes a supporting part 10, a load bending part 20, load beam part 30 and a flexure part 40. The supporting part 10 is swung in a seek direction parallel to the disk surface directly or indirectly by an actuator (not shown) such as a voice coil motor. The load bending part 20 is connected to the supporting part 10 so as to generate a load for pressing a magnetic head slider 50 toward the disk surface. The load beam part 30 is supported through the load bending part 20 by the supporting part 10 and transmits the load to the magnetic head slider 50. The flexure part 40 is supported by the load beam part 30 and the supporting part 10 while supporting the magnetic head slider 50.

The supporting part 10 is a member for supporting the load beam part 30 through the load bending part 20 while being directly or indirectly connected to the actuator, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the actuator.

The supporting part 10 may be preferably made from, for example, a stainless plate having a thickness of 0.1 mm to 0.8 mm.

It is of course possible to adopt as the supporting part 10 an arm having a proximal end that is connected to the swing center of the actuator.

As described above, the load beam part 30 is a member for transmitting the load generated by the load bending part 20 to the magnetic head slider 50, and therefore is required to have a predetermined rigidity.

As shown in FIGS. 1 and 3, in the present embodiment, the load beam part 30 has a plate-like main body portion 31 that faces the disk surface and paired right and left flange portions 32 that extend from both side edges of the main body portion 31 in a suspension width direction toward a direction away from the disk surface, and secures the rigidity by the flange portions 32.

The load beam part 30 may be preferably made from, for example, a stainless plate having a thickness of 0.02 mm to 0.1 mm.

The main body portion 31 is formed, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a rear surface opposite from a supporting surface that supports the magnetic head slider) of a head-mounting region 415 of the flexure part 40, which is mentioned below, so as to transmit the load to the head-mounting region 415 of the flexure part 40.

In the present embodiment, as shown in FIGS. 1 to 3, the load beam part 30 further integrally includes a lift tab 34 that extends from a distal end of the main body portion 31 toward the distal side in the suspension longitudinal direction. The lift tab 34 is a member that engages with a lamp provided in a magnetic disk device so as to cause the magnetic head slider 50 to be away from the disk surface in z direction (a direction perpendicular to the disk surface; see FIG. 2) at the time when the magnetic head suspension 1A is swung by the actuator so that the magnetic head slider 50 is positioned outward from the disk surface in a radial direction.

Furthermore, in the present embodiment, as shown in FIGS. 1 and 2, the main body portion 31 of the load beam part 30 has a tapered shape in a plan view in which both edges of the main body portion 31 come closer to a suspension longitudinal center line CL as they go from the proximal side to the distal side.

The configuration makes it possible to reduce moment of inertia of distal side of the load beam part 30 around the center line CL, thereby increasing resonant frequencies.

The load bending part 20 includes paired right and left leaf springs 21 that have proximal end portions connected to the supporting part 10 and distal end portions connected to the load beam part 30 in a state where a plate surface of each of the leaf springs faces the disk surface so as to generate a pressing load for pressing the magnetic head slider 50 toward the disk surface upon being elastically deformed.

Each of the paired leaf springs 21 is made from a stainless steel plate of 0.02 mm to 0.1 mm thick, for example.

In the present embodiment, the paired leaf springs 21 are integrally formed with a member that forms the supporting part 10.

More specifically, in the present embodiment, as shown in FIGS. 1 and 2, the supporting part 10 includes first and second plate members 110, 120 that are fixed to each other in a state of being laminated. The paired leaf springs 21 are integrally formed with the second plate member 120.

More specifically, as shown in FIG. 2, the second plate member 120 includes a central region 121, paired right and left distal regions 122, and paired right and left extending regions 123. The central region 121 corresponds to the boss portion 15, and is fixed to a corresponding region of the first plate member 110 in a state of being brought into contact with the same. The paired distal regions 122 extend toward the distal side in the suspension longitudinal direction from both sides of the central region 121 in the suspension width direction, and are fixed to a corresponding region of the first plate member 110 in a state of being brought into contact with the same. The paired extending regions 123 extend toward the distal side in the suspension longitudinal direction from the paired distal regions 122, respectively, and form the paired leaf springs 21.

The flexure part 40 is fixed by welding or the like to the load beam part 30 and the supporting part 10 while supporting the magnetic head slider 50.

More specifically, the flexure part 40 includes a flexure metal plate 410.

As shown in FIG. 2, the flexure metal plate 410 includes a supporting part fixed region 411, a load beam part fixed region 412, paired supporting pieces 413 (see FIG. 1) and the head-mounting region 415.

The supporting part fixed region 411 is fixed by a welding or the like to the supporting part 10. The load beam part fixed region 412 is fixed by a welding or the like to the load beam part 30. The paired supporting pieces 413 extend toward the distal side in the suspension longitudinal direction from both sides, in the suspension width direction, of the distal portion of the load beam part fixed region 412. The head-mounting region 415 is supported by the supporting pieces 413.

The magnetic head suspension 1A according to the present embodiment has a following configuration so that there is no height difference (displacement in the z direction) between the supporting part fixed region 411 and the load beam part fixed region 412 while having the configuration in which the paired leaf springs 21 are integrally formed with the member (the second plate member 120 in the present embodiment) forming the supporting part 10.

More specifically, as shown in FIG. 2, the paired distal regions 122 of the second plate member 120 are disposed away from each other in the suspension width direction so as to have a space 122a between them. A portion of the supporting part fixed region 411 that is positioned on a distal side in the suspension longitudinal direction is fixed to the first plate member 110 within the space 122a while a proximal portion of the load beam part fixed region 412 is fixed to the main body portion 31 of the load beam part 30 between members (the paired extending regions 123 in the present embodiment) forming the paired leaf springs 21 in the suspension width direction.

The head-mounting region 415 supports the magnetic head slider 50 at its lower surface that faces the disk surface, as shown in FIG. 2.

As explained earlier, the protrusion 33 is brought into contact with the upper surface or the rear surface of the head-mounting region 415, so that the head-mounting region 415 could sway flexibly in a roll direction and in a pitch direction, with the protrusion 33 functioning as a fulcrum.

The flexure metal plate 410 has rigidity lower than that of the load beam part 30, so that the head-mounting region 415 could sway in the roll direction and in the pitch direction.

The flexure metal plate 410 may be made from, for example, a stainless plate having a thickness of 0.01 mm to 0.025 mm.

Preferably, the flexure part 40 may be integrally provided with a wiring structure (not shown) for electrically connecting the magnetic head slider 50 to an outside member.

More specifically, the wiring structure 420 may include an insulating layer laminated on the lower surface of the flexure metal plate 410 that faces the disk surface, and a signal wiring laminated on a surface of the insulating layer that faces the disk surface.

Preferably, the signal wiring may also include an insulative cover layer enclosing the signal wiring.

A configuration with which the magnetic head suspension 1A is provided in order to allow the magnetic head slider 50 to be positioned onto the target track in a rapid and accurate manner will be now explained.

The magnetic head suspension 1A is driven in the seek direction by the actuator such as the voice coil motor. In order to allow the magnetic head slider 50 to be rapidly positioned onto the target track, it is needed to raise a frequency of a driving signal for the actuator.

In order to allow the magnetic head slider to be accurately positioned onto the target track in a state where the frequency of the driving signal for the actuator is raised, it is needed to raise a resonant frequency of the magnetic head suspension 1A.

In regard to this point, the magnetic head suspension 1A according to the present embodiment is configured so that the load beam part 30 is provided with the paired flange portions 32, as explained earlier.

The paired flange portions 32 can increase the rigidity of the magnetic head suspension 1A while preventing the mass increase as much as possible, thereby effectively raising the resonant frequency.

The magnetic head suspension 1A according to the present embodiment includes the paired flange portions 32 so that the magnetic head slider 50 can be rapidly moved thanks to increase of the resonant frequency, and, in addition to that, includes a following configuration so that a positioning accuracy of the magnetic head slider 50 can be enhanced by means of reduction of a displacement (gain) of the magnetic head slider 50 in the seek direction at the time when the magnetic head suspension 1A vibrates in the torsion mode.

More specifically, it is possible to minimize the displacement of the magnetic head slider 50 from the target track at the time when the magnetic head suspension 1A vibrates in the torsion mode by bending the magnetic head suspension 1A around a bending line along the suspension width direction and also setting a bending angle at the bending line and/or a position (bending position) of the bending line in the suspension longitudinal direction to respective optimum values.

In regard to this point, the magnetic head suspension 1A according to the present embodiment is bent around three bending lines of first to third bending lines BL1, BL2 and BL3 along with the suspension width direction, and can minimize the respective gains of the magnetic head slider 50 in the three torsion modes of the first to third torsion modes by adjusting the bending angles at the three bending lines and/or the bending positions of the three bending lines.

Described below are vibrations of the torsion modes.

If the frequency of the driving signal for the actuator is raised, a resonant vibration in the first torsion mode occurs in the magnetic head suspension 1A at the time when the frequency of the driving signal reaches a certain frequency (a first resonant frequency).

In the resonant vibration in the first torsion mode, in a state where a position of the distal edge of the supporting part 10 and a position of the dimple 33 of the load beam part 30 are fixed so as not to be displaced in the z direction perpendicular to the disk surface (namely, the positions form nodes), only the load beam part 30 is principally twisted about a twist center line along the suspension longitudinal center line CL so that a substantially center portion between the two nodes in the suspension longitudinal direction is displaced to the maximum in the z direction (namely, the substantially center portion forms an antinode).

If the frequency of the driving signal is further raised beyond the first resonant frequency, upon reaching another certain frequency (a second resonant frequency), a resonant vibration in the second torsion mode occurs in the magnetic head suspension 1A. If the frequency of the driving signal is furthermore raised beyond the second resonant frequency, upon reaching still another certain frequency (a third resonant frequency), a resonant vibration in the third torsion mode occurs in the magnetic head suspension 1A.

In the resonant vibration in the second torsion mode, in a state where three positions form the nodes, the three positions including a position at which the supporting part is rigidly fixed with respect to the z direction (in a case where the supporting part is configured by a base plate, a position of a boss portion 15 that is fixed by caulking to a carriage arm coupled to an actuator; hereinafter, referred to as a supporting part fixed position), a position at which the dimple 33 is arranged, and a halfway position of the load beam part that is located at a substantially center in the suspension longitudinal direction between the supporting part fixed position and the position of the dimple, a first region between the supporting part fixed position and the halfway position is twisted toward a first direction, which is one direction, around the twist center line along the suspension longitudinal center line CL while a second region between the halfway position and the dimple 33 is twisted toward a second direction, which is the other direction, around the twist center line, so that two portions form the antinode, the two portions including a substantially center portion between the supporting part fixed position and the halfway position of the load beam part 30 in the suspension longitudinal direction and a substantially center portion between the halfway position of the load beam part 30 and the position of the dimple 33 in the suspension longitudinal direction.

In the resonant vibration in the third torsion mode, in a state where four positions form the nodes, the four positions including the supporting part fixed position, the position of the load bending part 20, the position of the dimple 33 and the halfway position of the load beam part 30 that is located at a substantially center in the suspension longitudinal direction between the position of the load bending part 20 and the position of the dimple 33, a first region located between the supporting part fixed position and the position of the load bending part 20 is twisted toward a first direction, which is one direction, about the twist center line along the suspension longitudinal center line CL, a second region located between the position of the load bending part 20 and the halfway position of the load beam part 30 is twisted toward a second direction, which is the other direction, about the twist center line, and a third region located between the halfway position of the load beam part 30 and the position of the dimple 33 is twisted toward the first direction about the twist center line.

As shown in FIGS. 1 to 3, in the magnetic head suspension 1A according to the present embodiment, the first and second bending lines BL1, BL2 are arranged in the load beam part 30 while the third bending line BL3 is arranged in the paired leaf springs 21.

The gain of the magnetic head slider 50 in vibration of one of the torsion modes can be minimized by adjusting the bending angles around the bending lines (the first and second bending lines BL1, BL2) arranged in the load beam part 30 or adjusting the positions of the bending lines in the suspension longitudinal direction.

More specifically, for example, adjusting the Lending angle around the first bending line BL1 can minimize the gain in vibration of the first torsion mode, and adjusting the bending angle around the second bending line BL2 can minimize the gain in vibration of the second torsion mode.

On the other hand, adjusting the bending angle around the bending line (the third bending line BL3) arranged in the paired leaf springs 21 is utilized to set the pressing load, which press the magnetic head slider 50 toward the disk surface, to a predetermined value, and therefore cannot be utilized to adjust the gain in vibration of the torsion mode.

Accordingly, with respect to the bending line (the third bending line BL3) arranged in the paired leaf springs 21, adjusting the position of the bending line in the suspension longitudinal direction can be utilized to minimize the gain in vibration of the reaming torsion mode other than the two torsion modes of the first to third torsion modes, the gains in vibrations of the two torsion modes being adjusted with utilizing the first and second bending lines.

In the present embodiment, as shown in FIG. 1, provided that a distance in the suspension longitudinal direction between the distal edge of the supporting part 10 and the dimple 33 is represented by "L1", the first bending line BL1 is arranged within a center region that is away from the distal edge of the supporting part 10 by more than or equal to 0.4*L1 and less than or equal to 0.6*L1.

Arranging the first bending line BL1 within the center region makes it possible to widen an adjustable range (adjustable width) of the gain of the magnetic head slider 50 with a smaller bending angle around the first bending line BL1.

More specifically, the adjustable range (adjustable width) in which the gain of the magnetic head slider 50 can be adjusted by bending the suspension around the bending line depends on the displacement amount of the magnetic head slider 50 achieved by the bending process around the bending line, that is, the displacement amount of the magnetic head slider 50 between a pre-bending state and a post-bending state. The larger the displacement amount is, the wider the adjustable range of the gain of the magnetic head slider is.

With regard to this point, arranging the first bending line BL1 within the center region as in the present embodiment makes it possible to enlarge a displacement amount rate of the magnetic head slider 50 per bending angle around the first bending line BL1, thereby realizing a large adjustable range of the gain with a small bending angle.

In particular, in the magnetic head suspension having the load beam part 30 with the paired flange portions 32 as in the present embodiment, it is difficult or troublesome to enlarge the bending angle around the bending line along the suspension width direction due to the existence of the paired flange portions 32.

Accordingly, it is effective for this type of the magnetic head suspension to arrange the first bending line BL1 within the center region so as to realize a larger displacement amount with the bending angle that is as small as possible.

As shown in FIGS. 1 to 3, the second bending line BL2 is arranged closer to the proximal side in the suspension longitudinal direction than the first bending line BL1.

In order to make the displacement amount by the bending process around the second bending line BL2, which is arranged closer to the proximal side in the suspension longitudinal direction than the first bending line BL1, consistent with the displacement amount by the bending process around the first bending line BL1 (that is, in order to make the gain adjustable range in which the gain can be changed by bending around the second bending line BL2 identical to that by bending around the first bending line BL1), the bending angle around the second bending line BL2 has to be larger than that around the first bending line BL1.

However, in the magnetic head suspension 1A having the load beam part 30 with the paired flange portions 32, it is difficult that the bending angle at the bending line along the suspension width direction is made larger.

In regard to this point, the inventor of the present application made a following hypothesis.

In a case of making a comparison with respect to the resonant frequency between a first configuration in which the paired flange portions 32 are not provided at the proximal region of the load beam part 30 and a second configuration in which the paired flange portions 32 are provided at the entire region of the load beam part 30 in the suspension longitudinal direction, if a decreasing rate of the resonant frequency of the first configuration relative to that of the second configuration is little to such an extent that it would not become problematic, by disposing the second bending line BL2 within the proximal region of the load beam part 30 and not arranging the pair of flange portions 32 at a portion at which the second bending line BL2 is positioned, it would be possible to easily enlarge the bending angle at the second bending line BL2 without deteriorating the effect that the resonant frequency can be increased thanks to the pair of flange portions 32.

Described below are analyses performed for ascertaining whether the hypothesis is true.

Figure 4:
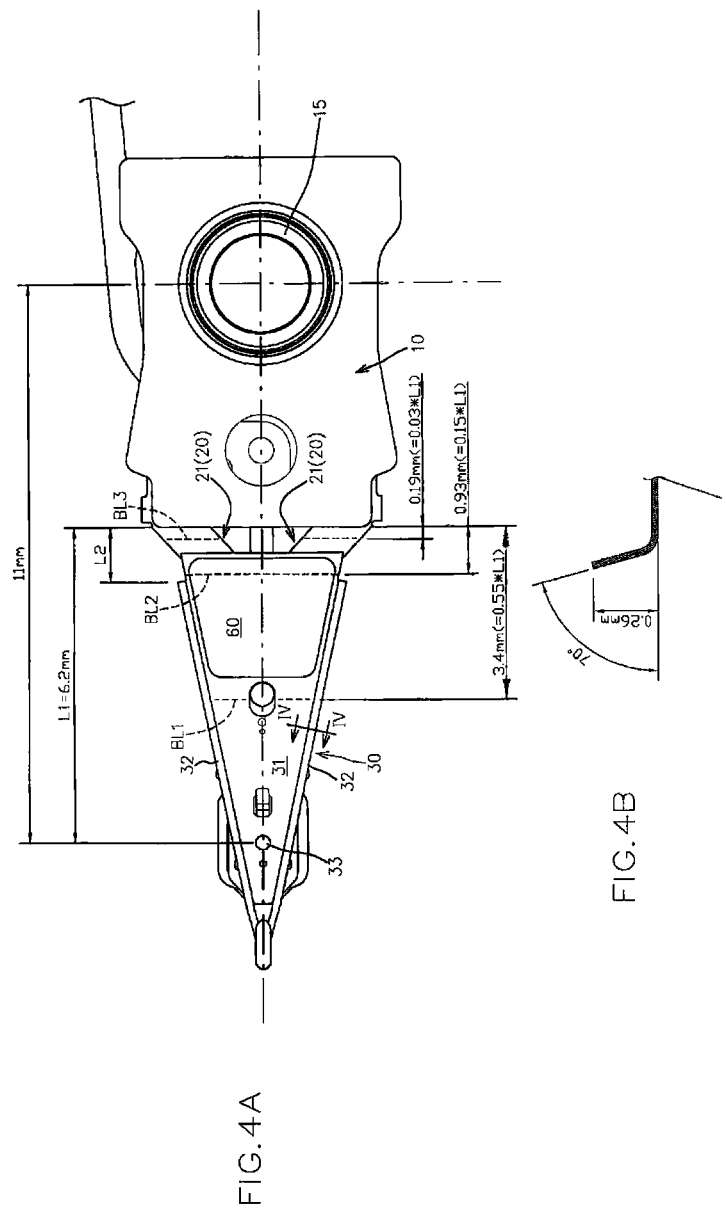
FIG. 4A is a top view of a magnetic head suspension according to an example A of the first embodiment.
FIG. 4B is a cross sectional view taken along line IV-IV in FIG. 41A.

FIG. 4A is a plan view of an "example A" used for the analysis, and FIG. 4B is a cross sectional view taken along line IV-IV in FIG. 4A.

The "example A" has following dimensions.

Thickness of the load beam part 30: 0.025 mm

Height of the paired flange portions 32: 0.26 mm

Bending angle of each of the paired flange portions 32 with respect to the main body portion 31: 70°

Length in the suspension longitudinal direction between a center of the boss portion 15 and the dimple 33 (in an initial condition before the bending processes at the first to third bending lines BL1 to BL3 are not made): 11 mm Length in the suspension longitudinal direction between a distal edge of the supporting part 10 and the dimple 33 in the initial condition: L1=6.2 mm Length in the suspension longitudinal direction between the distal edge of the supporting part 10 and the first bending line BL1 in the initial condition: 3.4 mm (=0.55*L1)

Length in the suspension longitudinal direction between the distal edge of the supporting part 10 and the second bending line BL2 in the initial condition: 0.93 mm (=0.15*L1)

Length in the suspension longitudinal direction between the distal edge of the supporting part 10 and the third bending line BL3 in the initial condition: 0.19 mm (=0.03*L1)

Prepared are a plurality of "examples A" having no flange regions whose lengths are different from one another while having the aforementioned dimensions, the no flange region being a region in which the pair of flange portions 32 are not provided.

More specifically, prepared are a configuration (hereinafter, referred to as "example A1") in which Length L2 in the suspension longitudinal direction between the distal edge of the supporting part 10 and the proximal edges of the pair of flange portions 32 is 0.99 mm (=0.16*L1) in the initial condition, a configuration (hereinafter, referred to as "example A2") in which the Length L2 is 1.24 mm (=0.20*L1) in the initial condition, a configuration (hereinafter, referred to as "example A3") in which the Length L2 is 1.49 mm (=0.24*L1) in the initial condition, a configuration (hereinafter, referred to as "example A4") in which the Length L2 is 1.74 mm (=0.28*L1) in the initial condition, and a configuration (hereinafter, referred to as "example A5") in which the Length L2 is 1.98 mm (=0.32*L1) in the initial condition.

Figure 5:
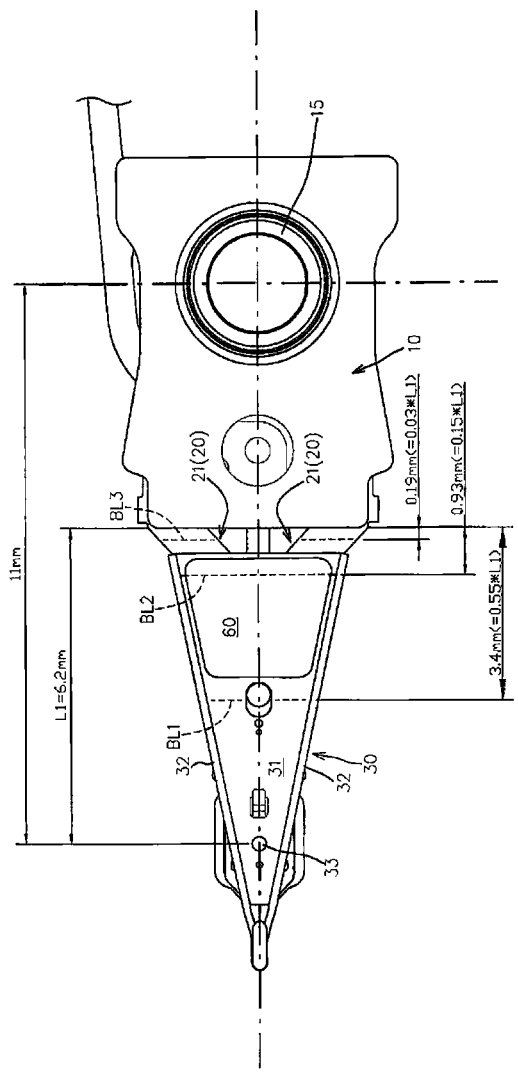
FIG. 5 is a top view of a magnetic head suspension according to a comparative example.

Also prepared is a configuration (hereinafter, referred to as "comparative example") in which the pair of flange portions 32 are provided over entire region of the load beam part 30 in the suspension longitudinal direction (see FIG. 5).

With respect to each of the "example A1" to "example A5" and the "comparative example", in a state where a reference portion (the boss portion 15) of the supporting part 10 is completely restrained and the disk-facing surface of the magnetic head slider 50 that faces the disk surface is restrained so as not to be displaced in z direction perpendicular to the disk surface, applied to the reference portion was a forced oscillation (steady-state vibration by periodic external force) in y direction along the suspension width direction so that a vibration in a fourth torsion mode occurs, and obtained were the resonant frequency in the fourth torsion mode on the basis of the finite element method.

The reason why the resonant frequency in the fourth torsion mode was obtained is that the gains of the magnetic head slider 50 in the vibrations in the first to third torsion modes could be minimized by setting the bending angles at the first and second bending lines BL1, BL2 and the bending position of the third bending line BL3 to the respective optimum values.

More specifically, the gain of the magnetic head slider 50 in the fourth torsion mode cannot be adjusted by adjusting the bending angles at and/or the bending position of the three bending lines of the first to third bending lines BL1 to BL3. Accordingly, a judgment is made on whether the pair of flange portions 32 have to be provided over the entire region of the load beam part 30 in the suspension longitudinal direction, based on comparison of the resonant frequencies in the fourth torsion mode of the "example A1" to "example A5" and the "comparative example."

Figure 6:
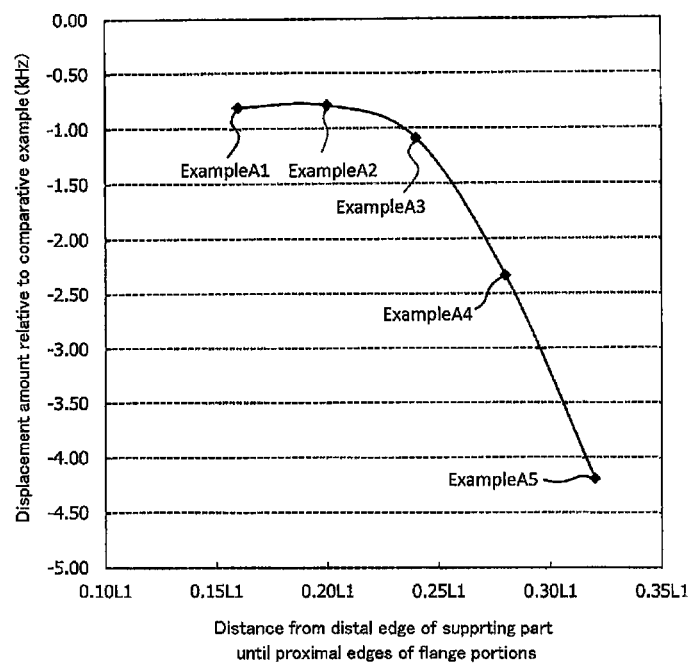
FIG. 6 is a graph of a result of an analysis made on the example A and the comparative example, the graph showing a relationship between a distance from the distal edge of the supporting part until the proximal edges of the flange portions and a displacement amount of the example A relative to the comparative example with respect to the fourth torsion mode.

FIG. 6 shows a result of this analysis.

In FIG. 6, the vertical axis corresponds to a displacement amount of the resonant frequency of each of the "example A1" to "example A5" with respect to that of the "comparative example."

It can be seen from FIG. 6 that the resonant frequency is not worsened so much even if the pair of flange portions 32 are omitted within the proximal region of the load beam part 30 that is arranged closer to the proximal side than a position away from the distal edge of the supporting part 10 by 0.22*L1.

It is understood from this fact that the arrangement in which the second bending line BL2 is disposed within the proximal region that is arranged closer to the proximal side in the suspension longitudinal direction than the position away from the distal edge of the supporting part 10 by 0.22*L1 and in which the pair of flange portions 32 are not existing at the second bending line BL2 makes it possible to facilitate the bending process at the second bending line BL2 without worsening the effect that the resonant frequency is increased thanks to the provision of the pair of flange portions 32.

The magnetic head suspension according to the present embodiment further includes a damper 60 fixed to a surface of the main body portion 31 that is opposite from the disk surface, as shown in FIG. 1.

The configuration makes it possible to damp the displacement of the magnetic head slider 50 at the time of the vibration of the magnetic head suspension 1A.

The damper 60 is preferably disposed so as to extend from a position closer to the proximal side in the suspension longitudinal direction than the first bending line MA until a position closer to the proximal side in the suspension longitudinal direction than the second bending line BL2.

The preferable configuration makes it possible to increase the resonant frequency in the torsion mode.

Figure 7:
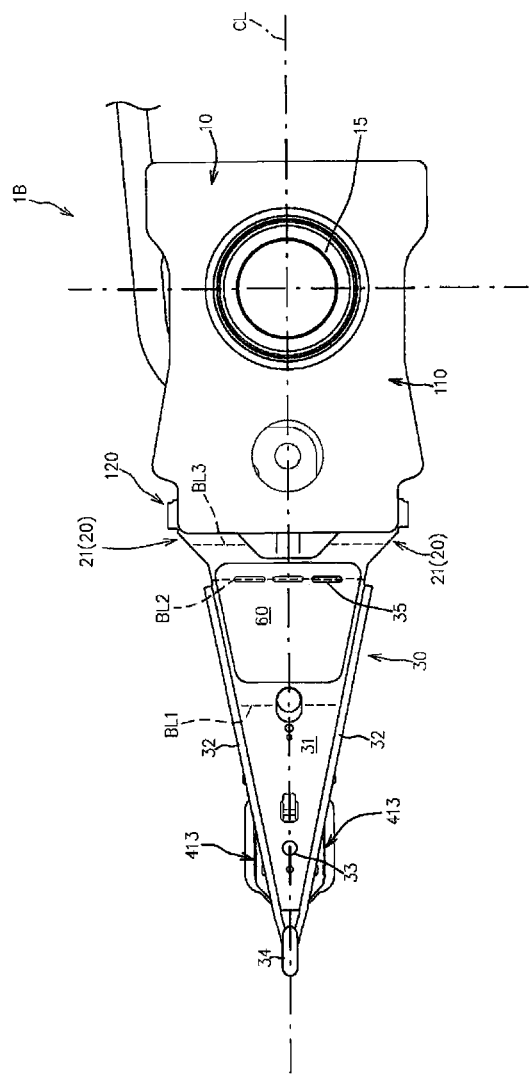
FIG. 7 is a top view of a modified example of the first embodiment.

FIG. 7 is a top view of a magnetic head suspension 1B according to a modified example of the present embodiment.

As shown in FIG. 7, the magnetic head suspension 1B has a bending-facilitated structure 35 on the second bending line BL2 of the main body portion 31 of the load beam part 30.

The configuration makes it possible to further facilitate bending process at the second bending line BL2.

For example, the bending-facilitated structure 35 may include one or more slits formed in the main body portion 31 so as to be on the second bending line BL2.

Second Embodiment

Hereinafter, another embodiment of the magnetic head suspension according to the present invention will be described, with reference to the attached drawings.

Figure 8:
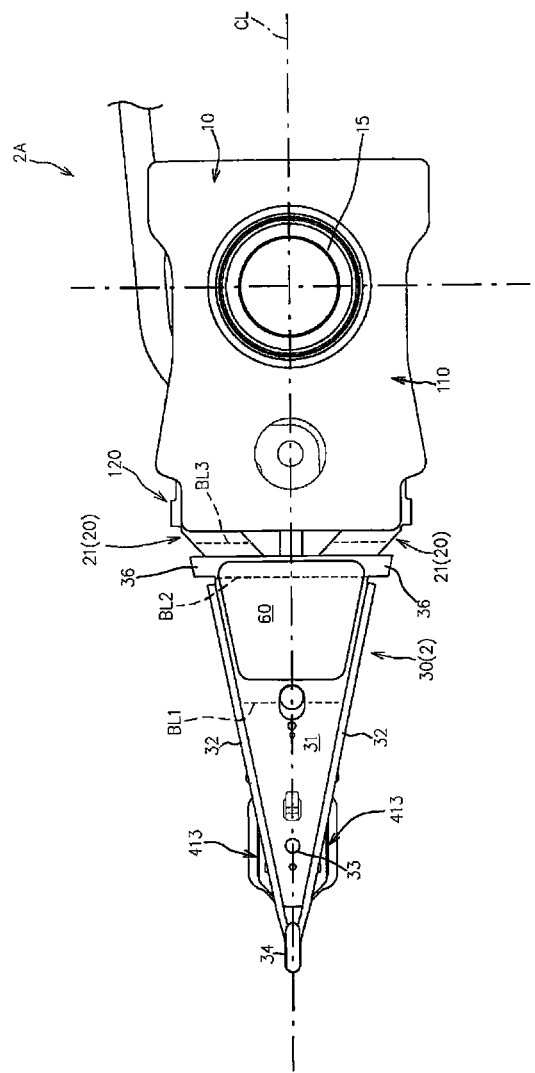
FIG. 8 is a top view of a magnetic head suspension according to a second embodiment of the present invention.

FIG. 8 is a top view (a plan view as viewed from a side opposite from a disk surface) of a magnetic head suspension 2A according to the present embodiment.

In the figure, the members same as those in the first embodiment are denoted by the same reference numerals to omit the detailed description thereof.

The magnetic head suspension 2A includes a load beam part 30(2) instead of the load beam part 30 in comparison with the magnetic head suspension 1A according to the first embodiment.

As shown in FIG. 8, the load beam part 30(2) includes a pair of right and left width-expanded portions 36 that are positioned closer to the proximal side in the suspension longitudinal direction than the second bending line BL2 and extend outward from the main body portion 31 in the suspension width direction, in addition to the main body portion 31 and the pair of flange portions 32.

The magnetic head suspension 2A with the configuration according to the present embodiment makes it possible to further enhance rigidity of the load beam part 30 to further increase the resonant frequency while realizing the effects in the first embodiment.

Typically, plural load beam parts 30(2) are formed from one raw material sheet 200 by etching process or the like. In this case, the plural load beam parts 30(2) are shaped by etching or the like with being connected with one another through bridges 205 as shown in FIG. 9, and then are separated from one another by cutting the bridges 205 in a final stage.

Accordingly, the load beam part 30(2) with the pair of width-expanded portions 36 can be easily made by forming the bridges 205 in such a manner as that the bridges 205 after being cut form the pair of width-expanded portions 36.

Figure 9:
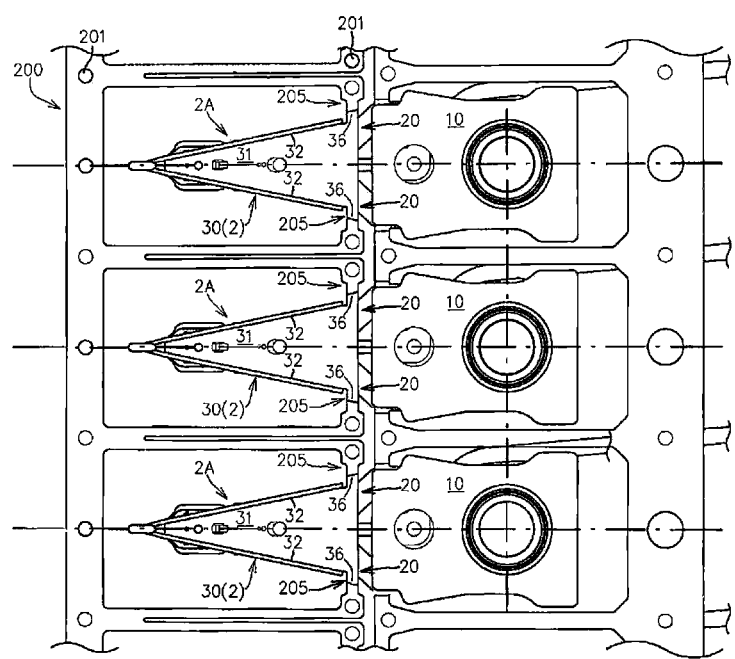
FIG. 9 is a plan view showing a halfway state in a manufacturing process of the magnetic head suspension according to the second embodiment.

FIG. 9 also shows positioning holes with reference numeral 201.

As in the first embodiment, the load beam part 30(2) is separate from the load bending part 20 in the present embodiment. Alternatively, the load beam part 30(2) can be formed integrally with the load bending part 20.

Figure 10:
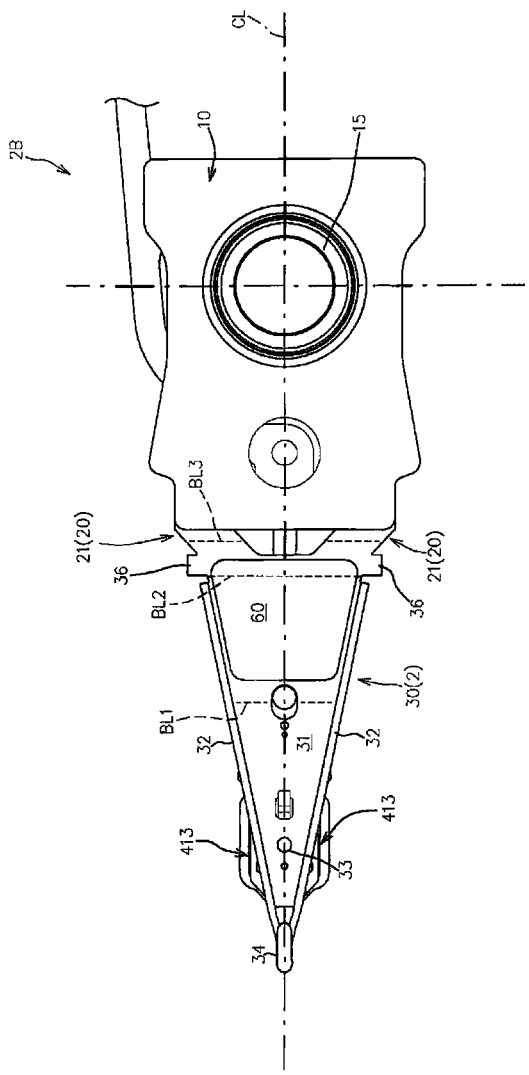
FIG. 10 is a top view of a magnetic head suspension according to a modified example of the second embodiment.
Figure 11:
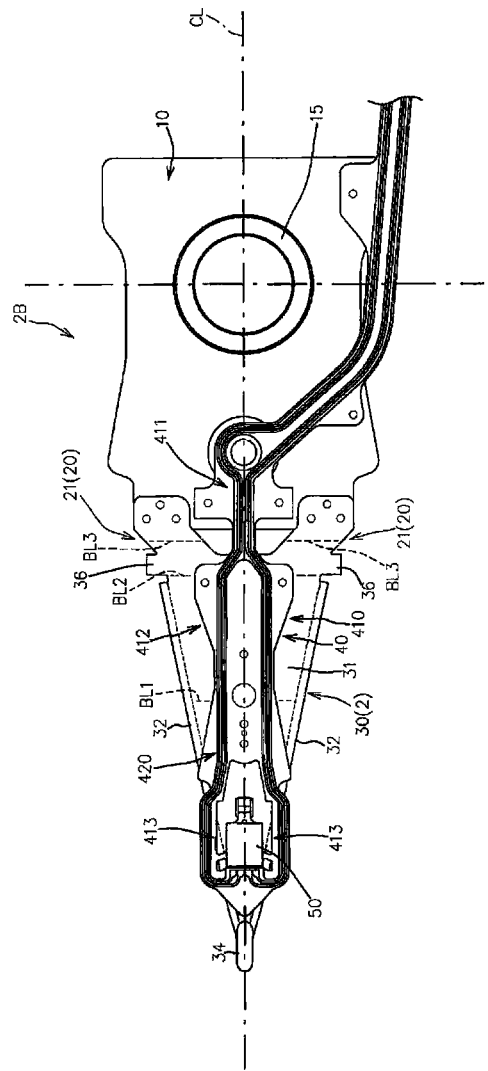
FIG. 11 is a bottom view of the magnetic head suspension shown in FIG. 10.

FIGS. 10 and 11 are a top view and a bottom view of a magnetic head suspension 2B in which the load beam part 30(2) and the load bending part 20 are integrally formed with each other, according to a modified example of the present embodiment, respectively.

It is of course possible that the load beam part 30 and the load bending part 20 are integrally formed with each other in the magnetic head suspension 1A according to the first embodiment.

Third Embodiment

Hereinafter, still another embodiment of the magnetic head suspension according to the present invention will be described, with reference to the attached drawings.

Figure 12:
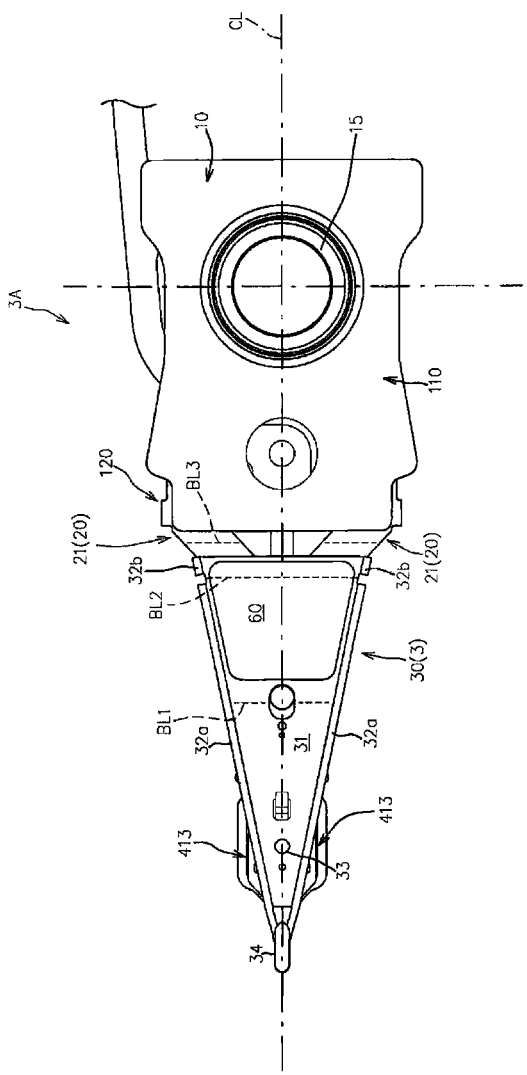
FIG. 12 is a top view of a magnetic head suspension according to a third embodiment of the present invention.

FIG. 12 is a top view (a plan view as viewed from a side opposite from a disk surface) of a magnetic head suspension 3A according to the present embodiment.

In the figure, the members same as those in the first and second embodiments are denoted by the same reference numerals to omit the detailed description thereof.

The magnetic head suspension 3A includes a load beam part 30(3) instead of the load beam part 30 in comparison with the magnetic head suspension 1A according to the first embodiment.

As shown in FIG. 12, the load beam part 30(3) includes the main body portion 31, distal-side flange portions 32a arranged in a region closer to the distal side in the suspension longitudinal direction than the proximal region that is within 0.22*L1 from the distal edge of the supporting part 10, and proximal-side flange portions 32b arranged in a region closer to the proximal side in the suspension longitudinal direction than the second bending line BL2.

The magnetic head suspension 3A with the configuration according to the present embodiment makes it possible to further enhance rigidity of the load beam part 30(3) to further increase the resonant frequency while realizing the effects in the first embodiment.

Fourth Embodiment

Hereinafter, still another embodiment of the magnetic head suspension according to the present invention will be described, with reference to the attached drawings.

Figure 13:
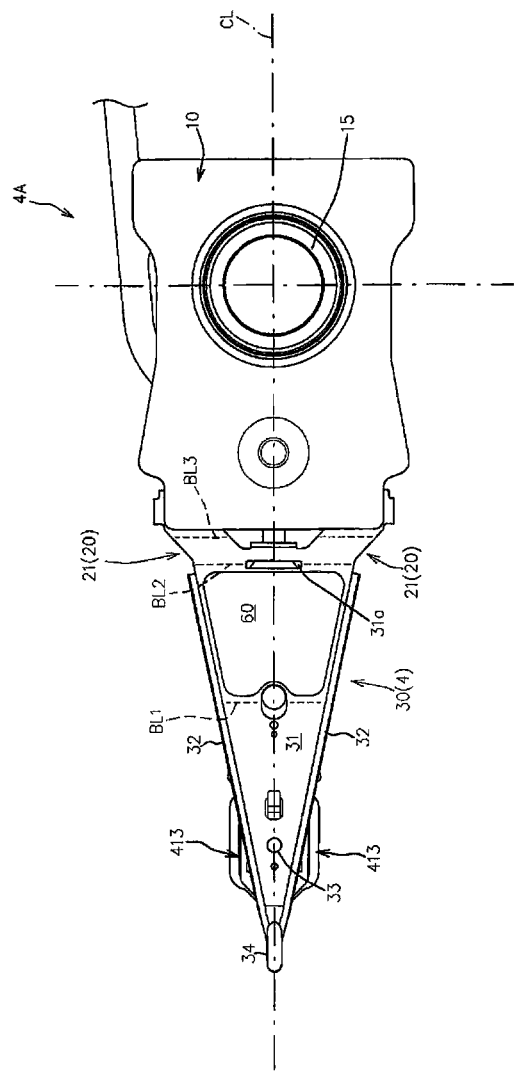
FIG. 13 is a top view of a magnetic head suspension according to a fourth embodiment of the present invention.

FIGS. 13 and 14 are a top view and a bottom view of a magnetic head suspension 4A according to the present embodiment, respectively.

In the figures, the members same as those in the first to third embodiments are denoted by the same reference numerals to omit the detailed description thereof.

The magnetic head suspension 4A includes a load beam part 30(4) instead of the load beam part 30 in comparison with the magnetic head suspension 1A according to the first embodiment.

As shown in FIGS. 13 and 14, the main body portion 31 and the flexure part 40 are overlapped with each other in such a manner as that, out of the main body portion 31 of the load beam part 30(4), an area (hereinafter, referred to as second bending line setting area) that is disposed at the same position as the second bending line BL2 in the suspension longitudinal direction includes an overlapped area that is overlapped with the flexure part 40 and a non-overlapped area that is not overlapped with the flexure part 40.

More specifically, the second bending line setting area of the main body portion 31 has a length in the suspension width direction longer than that of a corresponding area of the flexure part 40. The flexure part 40 extends along the suspension longitudinal direction so as to be across the second bending line setting area while being partially overlapped with the second bending line setting area with respect to the suspension width direction.

In the configuration, the overlapped area is formed with a through hole 31a penetrating in a direction orthogonal to the disk surface so that the second bending line BL2 is arranged only at the non-overlapped area.

The magnetic head suspension 4A with the configuration according to the present embodiment makes it possible to stabilize the bending process at the second bending line BL2 while realizing the effects in the first embodiment.

More specifically, if the second bending line BL2 is overlapped with the flexure part 40, the bending process at the second bending line BL2 is affected by the rigidity of the flexure part 40, resulting in the difficulty in accurately performing the bending process at the second bending line BL2.

On the other hand, if the overlapped area that is overlapped with the flexure part 40 is formed with the through hole 31a, and the second bending line BL2 is arranged only at the non-overlapped area as in the present embodiment, the affection of the flexure part 40 with respect to the bending process at the second bending line BL2 can be suppressed as much as possible, thereby stabilizing the bending process at the second bending line BL2.

In the present embodiment, the paired leaf springs 21 forming the load bending part 20 and the load beam part 30(4) are integrally formed with each other with a single member, as shown in FIGS. 13 and 14.

Explained below is a preferable configuration of the magnetic head suspension according to the first embodiment that can minimize the respective gains of the magnetic head slider 50 in the first to third torsion modes.

First, a configuration that can minimize the gains of the magnetic head slider 50 in the first and second torsion modes will be explained using an example (hereinafter referred to as "example B") of the magnetic head suspension according to the first embodiment.

Figures 15A, 15B:
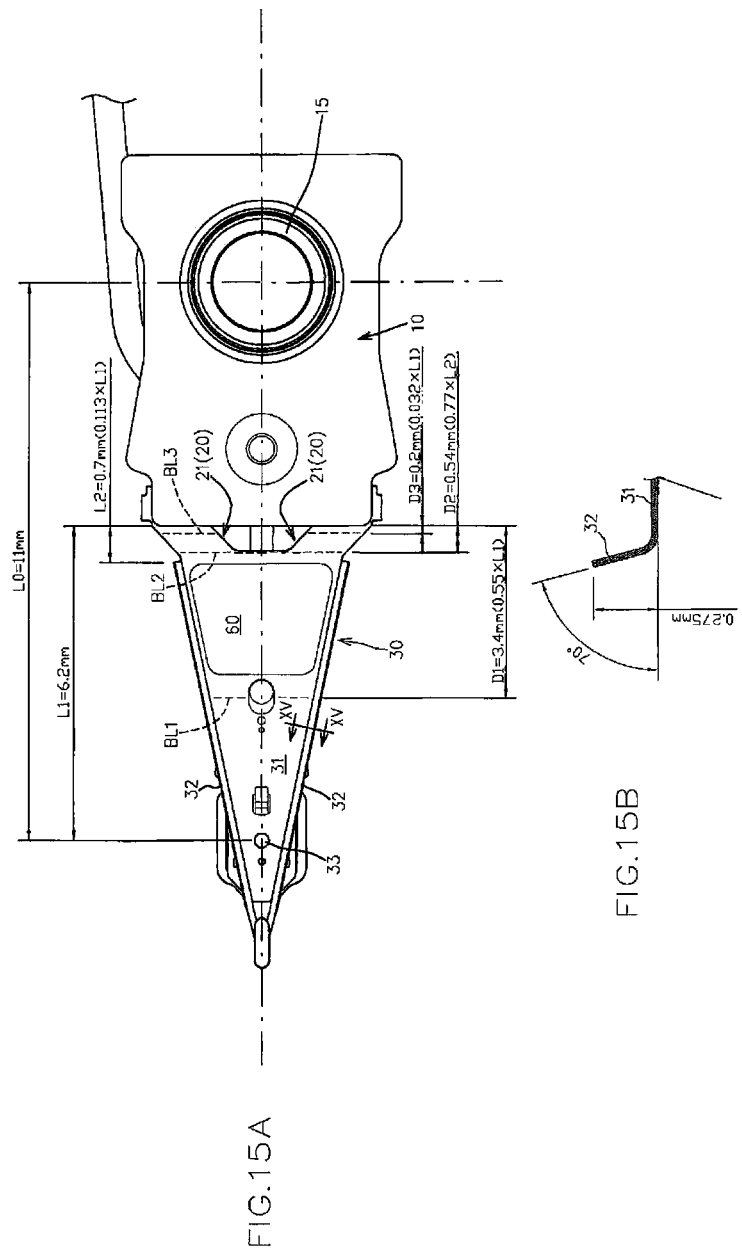
FIG. 15A is a top view of a magnetic head suspension according to an example B of the first embodiment.
FIG. 15B is a cross sectional view taken along line XV-XV in FIG. 15A.

FIG. 15A is a top view of the "example B", and FIG. 15B is a cross sectional view taken along line XV-XV in FIG. 15A.

FIG. 16 is a side view of the "example B."

The "example B" has following basic dimensions.

Thickness of the supporting part 10: 0.15 mm
Thickness of the beam part 30: 0.025 mm
Height of the paired flange portions 32: 0.275 mm
Bending angle of each of the paired flange portions 32 with respect to the main body portion 31: 70°

Length in the suspension longitudinal direction between the center of the boss portion 15 and the dimple 33 (in an initial condition before the bending processes at the first to third bending lines BL1 to BL3 are not made): L0=11 mm Length in the initial condition between the distal edge of the supporting part 10 and the dimple 33 in the suspension longitudinal direction: L1=6.2 mm Length in the suspension longitudinal direction between the distal edge of the supporting part 10 and the proximal edges of the paired flange portions 32 in the initial condition: L2=0.7 mm (=0.113*L1)

Length in the suspension longitudinal direction between the distal edge of the supporting part 10 and the first bending line BL1 in the initial condition: D1=3.4 mm (=0.55*L1)

Length in the suspension longitudinal direction between the distal edge of the supporting part 10 and the second bending line BL2 in the initial condition: D2=0.54 mm (=0.77*L2)

Length in the suspension longitudinal direction between the distal edge of the supporting part 10 and the third bending line BL3 in the initial condition: D3=0.2 mm (=0.032*L1)

An adjustment of the bending angle $\theta 1$ at the first bending line BL1 will be now explained.

Prepared were a plurality of magnetic head suspensions in which the bending angle $\theta 1$ at the first bending line BL1 is fixed to 1 degree and the bending angle $\theta 2$ at the second bending line BL2 is fixed to −6 degrees while having the basic dimensions. The plurality of magnetic head suspensions were configured so that lengths ZH (the length ZH means a height under condition of being assembled into a hard disk drive, and is hereinafter referred to as "setting height") in the z direction orthogonal to the disk surface between the lower surface (the disk-facing surface) of the magnetic head slider 50 and the upper surface of the supporting part fixed position (see FIG. 16) were different from one another by varying the bending angles $\theta 3$ at the third bending lines BL3.

The minus or negative in the bending angle means that the magnetic head suspension is bent so as to be convex toward the direction opposite from the disk surface, and the plus or positive in the bending angle means that the magnetic head suspension is bent so as to be convex toward the disk surface.

A following analysis was made on each of the plurality of magnetic head suspensions on the basis of the finite element method.

More specifically, on each of the plurality of suspensions, in a state where the supporting part fixed position is restrained so as not to be displaced in z direction and also in x direction along the suspension longitudinal direction as well as the disk-facing surface of the magnetic head slider 50 is restrained so as not to be displaced in z direction, applied to the supporting part fixed position was a forced oscillation (steady-state vibration by periodic external force: frequency range between 100 Hz-30 kHz) in y direction along the suspension width direction so that the suspension was vibrated in the first torsion mode, and obtained was the gain of the magnetic head slider 50, the gain being represented by a ratio of the displacement amount (or acceleration) of the magnetic head slider 50 in the suspension width direction relative to the displacement amount (or acceleration) of the supporting part fixed position due to the forced oscillation applied to the supporting part fixed position.

It was specified which one of the plurality of magnetic head suspensions had a minimum gain so that the setting height ZH (hereinafter, referred to as minimum gain-setting height ZH(min) of the one magnetic head suspension was obtained.

A configuration having the minimum gain makes it possible to reduce the displacement of the magnetic head slider 50 from the target track as much as possible even if the magnetic head suspension is vibrated in the first torsion mode.

In this condition, out of the plurality of magnetic head suspensions, the magnetic head suspension having the minimum gain had the setting height ZH (the minimum gain-setting height ZH) of −0.03 mm.

Figure 17:
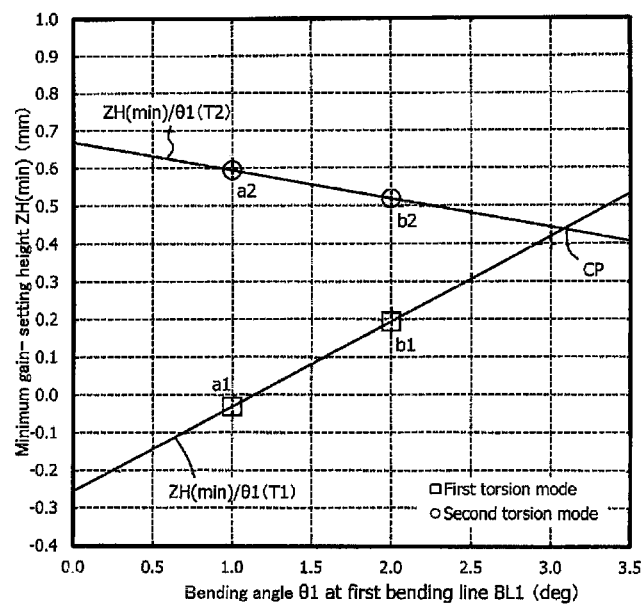
FIG. 17 is a graph of a result of an analysis made on the magnetic head suspension according to the example B, the graph showing a relationship between a bending angle at a first bending line and a setting height of the magnetic head slider that causes the gains in the first and second torsion modes to be minimized.

The result is plotted in FIG. 17 in which the horizontal axis corresponds to the bending angle $\theta 1$ and the vertical axis corresponds to the minimum gain-setting height ZH(min) ("a1" in FIG. 17).

The same analysis was made in a state where the bending angle $\theta 1$ was changed to 2 degrees.

In this condition, the minimum gain-setting height ZH(min) was 0.195 mm.

The result is also plotted in FIG. 17 ("b1" in FIG. 17).

A line ZH(min)/$\theta$s(T1) was obtained by connecting the point "a1" and the point "b1", the line showing a relationship between the bending angle $\theta 1$ and the setting height ZH(min) in the first torsion mode (see FIG. 17).

A combination of the bending angle $\theta 1$ and the setting height ZH that satisfies the relationship defined by the line ZH(min)/$\theta$s(T1) makes it possible to reduce the displacement of the magnetic head slider 50 as much as possible even if the magnetic head suspension is vibrated in the first torsion mode.

The same analysis was made with respect to the second torsion mode.

In a condition in which the bending angle $\theta 1$ is fixed to 1 degree and, the bending angle $\theta 2$ is fixed to −6 degrees while having the basic dimensions, the minimum gain-setting height ZH(min) was 0.595 mm.

This result is also plotted in FIG. 17 ("a2" in FIG. 17).

The same analysis was performed in a state where the bending angle $\theta 2$ was changed to 2 degrees.

In this condition, the minimum gain-setting height. ZH(min) was 0.520 mm.

The result is also plotted in FIG. 17 ("b2" in FIG. 17).

A line ZH(min)/$\theta$s(T2) was obtained by connecting the point "a2" and the point "b2", the line showing a relationship between the bending angle $\theta 1$ and the setting height ZH(min) in the second torsion mode (see FIG. 17).

A combination of the bending angle $\theta 1$ and the setting height ZH that satisfies the relationship defined by the line ZH(min)/$\theta$s(T2) makes it possible to reduce the displacement of the magnetic head slider 50 as much as possible even if the magnetic head suspension is vibrated in the second torsion mode.

The combination of the bending angle $\theta 1$ and the setting height ZH ($\theta 1$=3.08 degrees and ZH=0.439 mm in the present embodiment) defined by an intersection point CP at which the line ZH(min)/$\theta$s(T1) and the line ZH(min)/$\theta$s(T2) are intersected with each other makes it possible to minimize the gains in both the first and second torsion modes.

By the way, the setting height ZH is a parameter to be determined in accordance with the specification of a hard disk device in which the magnetic head suspension is installed, rather than a parameter to be freely set.

Therefore, an adjustment work is needed to change the position of the intersection point CP so that the setting height ZH at the intersection point CP is consistent with a setting height (hereinafter referred to as target setting height ZH(O)) defined by the specification of the hard disk surface.

It is achieved to make the setting height ZH at the intersection point CP consistent with the target setting height ZH(O)) by shifting the line ZH(min)/$\theta$s(T1) and the line ZH(min)/$\theta$s(T2) in parallel along the vertical axis in FIG. 17.

It is achieved to shift the line ZH(min)/θs(T1) and the line ZH(min)/θs(T2) in parallel along the vertical axis in FIG. 17 by changing the position D3 of the third bending line BL3 with respect to the suspension longitudinal direction.

This point will be explained in detail.

Prepared were a plurality of magnetic head suspensions having the bending angle θ1 set to 2 degrees and the bending angle θ2 set to −6 degrees while having the basic dimensions. In the plurality of magnetic head suspensions, the bending angles θ3 at the third bending line BL3 were made dissimilar to one another so that their setting heights ZH are different from one another.

A following analysis was made on each of the plurality of magnetic head suspensions on the basis of the finite element method More specifically, applied was a forced oscillation to each of the plurality of suspensions so that the suspension was vibrated in the first torsion mode, and specified was which one magnetic head suspension had a minimum gain.

The setting height ZH (the minimum gain-setting height ZH) of the one magnetic head suspension was 0.195 mm.

Figure 18:
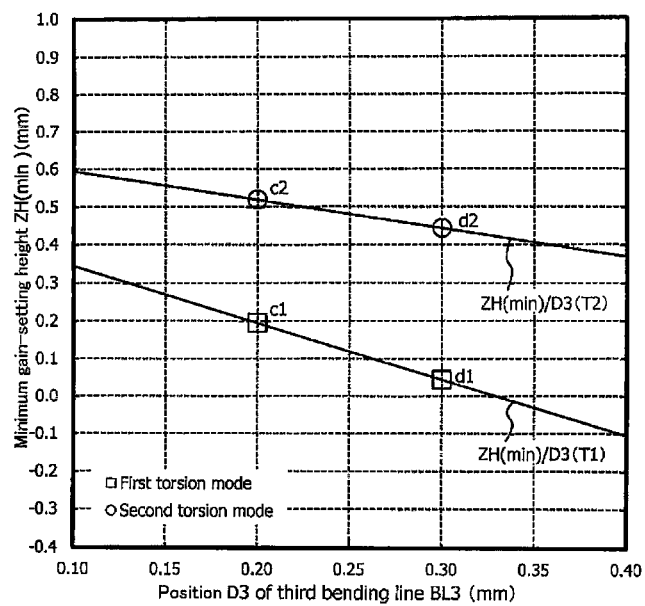
FIG. 18 is a graph of a result of an analysis made on the magnetic head suspension according to the example B, the graph showing a relationship between a position of the third bending line and the setting height of the magnetic head slider that causes the gains in the first and second torsion modes to be minimized.

This result is plotted in FIG. 18 in which the horizontal axis corresponds to the position D3 and the vertical axis corresponds to the minimum gain-setting height ZH(min) ("c1" in FIG. 18).

The same analysis was made in a condition where only the position D3 is changed to 0.3 mm (=0.048*L1).

In this condition, the minimum gain-setting height ZH(min) was 0.045 mm.

The result is also plotted in FIG. 18 ("d1" in FIG. 18).

A line ZH(min)/D3(T1) was obtained by connecting the point "c1" and the point "d1", the line showing a relationship between the position D3 and the setting height ZH(min) in the first torsion mode (see FIG. 18).

The line ZH(min)/D3(T1) can indicate a side, that is the distal side or the proximal side, in the suspension longitudinal direction to which the third bending line BL3 has to be shifted as well as a distance by which the third bending line BL3 has to be shifted, in order to cause the minimum gain-setting height ZH(min) in the first torsion mode to become larger (or smaller) by a predetermined length.

In the example shown in FIG. 18, making D3 smaller (that is, shifting the third bending line BL3 toward the proximal side in the suspension longitudinal direction) causes the minimum gain-setting height ZH(min) in the first torsion mode to become larger, and the amount by which the minimum gain-setting height ZH(min) becomes larger could be obtained by an inclination of the line ZH(min)/D3(T1).

The same analysis was made with respect to the second torsion mode.

In a condition in which the bending angle θ1 is fixed to 2 degrees and the bending angle θ2 is fixed to −6 degrees while having the basic dimensions, the minimum gain-setting height ZH(min) was 0.520 mm.

This result is plotted in FIG. 18 ("c2" in FIG. 18).

The same analysis was made in a condition where only the position D3 is changed to 0.3 mm (=0.048*L1).

In this condition, the minimum gain-setting height ZH(min) was 0.445 mm.

The result is also plotted in FIG. 18 ("d2" in FIG. 18).

A line ZH(min)/D3(T2) was obtained by connecting the point "c2" and the point "d2", the line showing a relationship between the position D3 and the setting height ZH(min) in the second torsion mode (see FIG. 18).

The line ZH(min)/D3(T2) can indicate a side, that is the distal side or the proximal side, in the suspension longitudinal direction to which the third bending line BL3 has to be shifted as well as a distance by which the third bending line BL3 has to be shifted, in order to cause the minimum gain-setting height ZH(min) in the second torsion mode to become larger (or smaller) by a predetermined length.

With using the thus obtained line ZH(min)/D3(T1) and the line ZH(min)/D3(T2), it is possible to shift the position of the intersection point CP so that the setting height ZH at the intersection point CP in FIG. 17 is consistent with the target setting height ZH(O).

A following explanation will be made with taking as an example a case where the target setting height ZH(O) is 0.57 mm.

Since the setting height ZH at the intersection point CP in FIG. 17 is 0.439 mm as explained above, the setting height ZH at the intersection point CP can be consistent with 0.57 mm which is the target setting height ZH(O) by shifting the line ZH(min)/θ1(T1) and/or the line ZH(min)/θ1(T2), which are shown in FIG. 17, upward along the vertical axis.

The line ZH(min)/θ1(T1) and/or the line ZH(min)/θ1(T2) can be shifted upward along the vertical axis (see FIG. 18) by making D3 smaller.

In other words, the setting height ZH at the intersection point CP can be brought closer to 0.57 mm of the target setting height ZH(O) by making D3 smaller, that is by shifting the position of the third bending line BL3 toward the distal side in the suspension longitudinal direction, and the amount to be shifted can be obtained from the inclinations of the two lines.

In this analysis, the setting height ZH at the intersection point CP was consistent with 0.57 mm of the target setting height ZH(O) by setting D3 to 0.06 mm. In this case where D3 was set to 0.06 mm, the angle θ1 was 2.73 degrees.

Described below is an analysis regarding vibration characteristic of the magnetic head suspension 100 having θ1 and D3 set by such adjustment work, the analysis being made on the basis of the finite element method.

More specifically, prepared was a magnetic head suspension having the basic dimensions except for D3, and also having θ1 set to 2.73 degrees, θ2 set to −6 degrees and D3 set to 0.06 mm so that the gains in the first and second torsion modes are minimized and the setting height ZH is 0.57 mm of the target setting height ZH(O). On the magnetic head suspension, in a state where the supporting part fixed position is restrained so as not to be displaced in z direction and also in x direction along the suspension longitudinal direction as well as the disk-facing surface of the magnetic head slider 50 is restrained so as not to be displaced in z direction, applied to the supporting part fixed position was a forced oscillation (steady-state vibration by periodic external force: frequency range between 100 Hz-30 kHz) in y direction along the suspension width direction, and obtained was the gain of the magnetic head slider 50, the gain being represented by a ratio of the displacement amount (or acceleration) of the magnetic head slider 50 in the suspension width direction relative to the displacement amount (or acceleration) of the supporting part fixed position due to the forced oscillation applied to the supporting part fixed position. The angle θ3 is suitably adjusted so as to have the load for pressing the magnetic head slider 50 set to a predetermined value. In this analysis, the angle θ3 was adjusted so that the pressing load was 2 gram-force.

Figure 19:
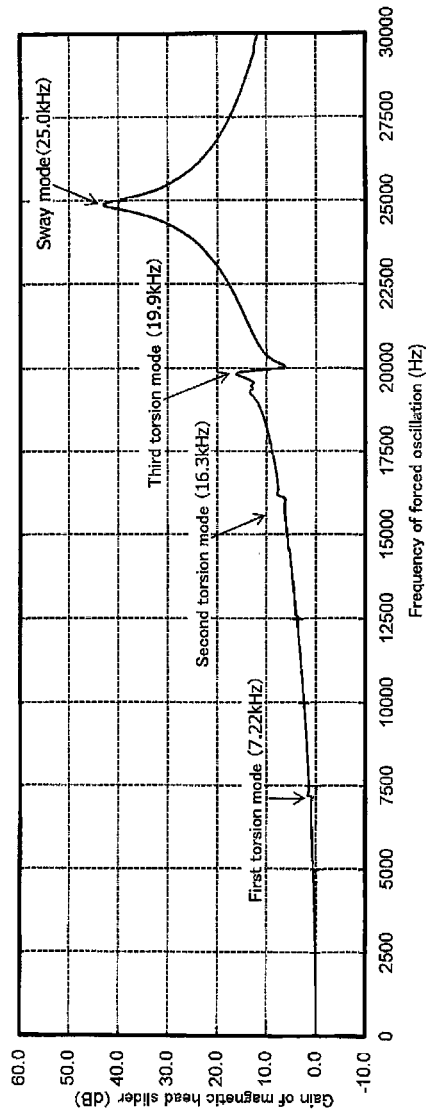
FIG. 19 is a graph of a result of an analysis made on a magnetic head suspension in which the gains in the first and second torsion modes have been minimized by means of an adjustment of the bending angle at the first bending line and an adjustment of the position of the third bending line, the graph showing resonant frequencies in the first to third torsion modes and the sway mode as well as the gain of the magnetic head slider.

FIG. 19 is a result of the analysis.

It is confirmed from FIG. 19 that, although the suspension resonates in the first torsion mode around the frequency of 7.22 kHz and also resonates in the second torsion mode around the frequency of 16.3 kHz, the gains in the first and second torsion modes are minimized.

It is also confirmed from FIG. 19 that the suspension resonates in the third torsion mode around the frequency of 19.9 kHz, and the gain in the third torsion mode has a significant large value of 16.2 dB.

It is also confirmed from FIG. 19 that suspension resonates in the sway mode around the frequency of 25.0 kHz, and the gain in the sway mode has a significant large value of 43.1 dB.

Explained below is a configuration that is effective for the vibrations in the third torsion mode and the sway mode.

As explained earlier, the gains in the first and second torsion modes are minimized by adjusting the positions of and the bending angles at the first bending line BL1 and the third bending line BL3.

Accordingly, it is not possible to enhance the vibration characteristic in the third torsion mode and the sway mode by adjusting the positions of and the bending angles at the first bending line BL1 and the third bending line BL3, and it is needed to improve the vibration characteristic by adjusting the position of and the bending angle at the second bending line BL2 other than the first and third bending lines.

Figure 20:
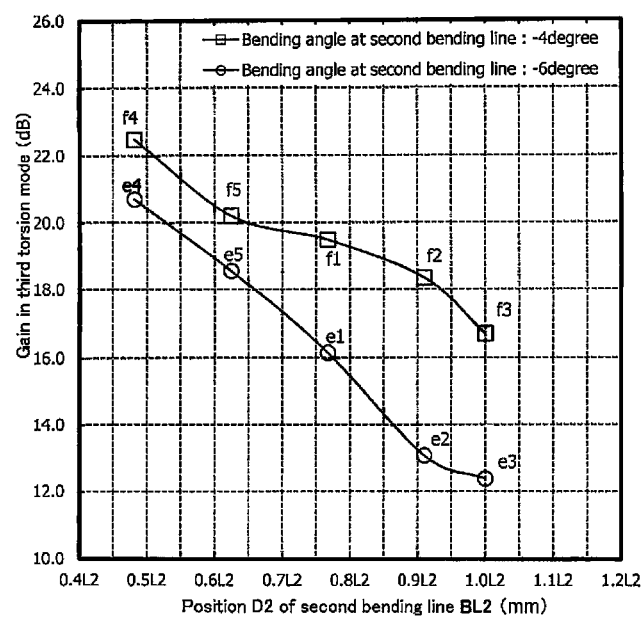
FIG. 20 is a graph of a result of an analysis made on the magnetic head suspension on which the analysis in FIG. 19 is made, the graph showing a relationship between the position of the second bending line and the gain of the magnetic head slider in the third torsion mode.

In this regard, a relationship between D2 in the magnetic head suspension used in the analysis shown in FIG. 19 and the gain in the third torsion mode was plotted in FIG. 20 ("e1" in FIG. 20).

Figure 21:
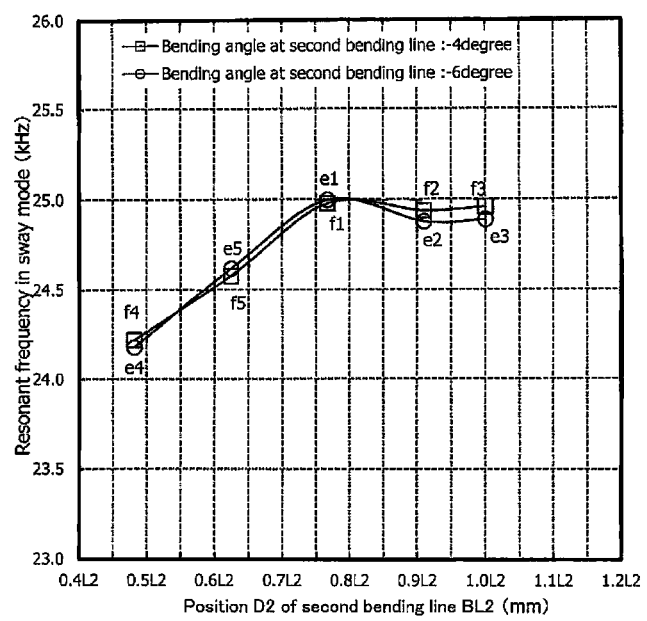
FIG. 21 is a graph of a result of an analysis made on the magnetic head suspension on which the analysis in FIG. 19 is made, the graph showing a relationship between the position of the second bending line and the resonant frequency in the sway mode.

A relationship between D2 in the magnetic head suspension used in the analysis shown in FIG. 19 and the resonant frequency in the sway mode was plotted in FIG. 21 ("e1" in FIG. 21).

Analyses same as in FIGS. 17 and 18 were made using a magnetic head suspension having the basic dimensions except that D2 was changed to 0.637 mm (=0.91*L2).

In result, in a case where D2 is 0.637 mm 0.91*L1), by setting the angle θ1, the angle θ2 and D3 to 2.79 degrees, −6 degrees and 0.21 mm 0.029*L2), respectively, the gains in the first and second torsion modes can be minimized while having the setting height ZH consistent with the target setting height ZH(O). As explained earlier, the angle θ3 is suitably adjusted so as to have the load for pressing the magnetic head slider 50 set to a predetermined value. In this analysis, the angle θ3 was adjusted so that the pressing load was 2 gram-force.

The same analysis was made on the magnetic head suspension as that in FIG. 19. In result, the gain in the third torsion mode was 13.1 dB, and the resonant frequency in the sway mode is 24.88 kHz.

These results are shown in FIGS. 20 and 21, respectively ("e2").

The same analysis was made using a magnetic head suspension having the basic dimensions except that D2 was changed to 0.7 mm (=1.0*L2).

The result is also shown in FIGS. 20 and 21, respectively ("e3").

The same analysis was made using a magnetic head suspension having the basic dimensions except that D2 was changed to 0.336 mm (=0.48*L2).

The result is also shown in FIGS. 20 and 21, respectively ("e4").

The same analysis was made using a magnetic head suspension having the basic dimensions except that D2 was changed to 0.434 mm (=0.62*L2).

The result is also shown in FIGS. 20 and 21, respectively ("e5").

The same analyses were made on each of magnetic head suspensions in which the angle θ2 was changed to −4 degrees from −6 degrees in comparison with the magnetic head suspensions shown with "e1" to "e5."

These results are also shown in FIGS. 20 and 21 ("f1" to "f5").

It is confirmed from FIG. 20 that, in spite of the bending angle θ2 at the second bending line BL2, the gain in the third torsion mode can be reduced as the second bending line BL2 is moved toward the distal side in the suspension longitudinal direction so as to come closer to the proximal edges of the paired flange portions 32 (that is, as D2 comes closer to 1.0*L2).

It is confirmed from FIG. 21 that, in spite of the bending angle θ2 at the second bending line BL2, the resonant frequency in the sway mode is increased as the second bending line BL2 is moved toward the distal side from the proximal side in the suspension longitudinal direction, and is kept at the substantially highest value after D2 reaches to 0.7*L2.

That is, FIG. 21 shows that the condition of 0.7*L2≦D2 makes it possible to increase the resonant frequency in the sway mode to the highest level.

In view of the above, the arrangement of the second bending line BL2 in such a manner as to satisfy the condition of 0.7*L2≦D2≦1.0*L2 makes it possible to increase the resonant frequency in the sway mode and reduce the gain in the third torsion mode while realizing the effect of facilitating the bending process around the second bending line BL2. In a preferable configuration, the second bending line BL2 is arranged so as to satisfy the condition of D2=1.0*L2.

Described below is an analysis made regarding the bending angle (including the bending direction) at the second bending line BL2.

The same analysis as those in FIGS. 17 and 18 was made using a magnetic head suspension in which the length D2 was changed to 0.637 mm (=0.91*L2) in comparison with the basic dimensions of the "example B" and the bending angle θ2 at the second bending line BL2 was set to −6 degrees.

A negative bending angle means that the magnetic head suspension is bent so as to be convex toward the direction opposite from the disk surface, and a positive bending angle means that the magnetic head suspension is bent so as to be convex toward the disk surface.

The angle θ3 at the third bending line BL3 was adjusted so as to have the load for pressing the magnetic head slider 50 set to a predetermined value (2 gram-force in this analysis). In this analysis, the bending angle θ3 had a negative value.

In the magnetic head suspension having the dimensions, the condition in which the bending angle θ1 was set to 2.79 degrees and the length D3 was set to 0.021 mm caused the setting height ZH to be 0.57 mm of the target setting height while minimizing the gains in the first and second torsion modes.

The same analysis as that in FIG. 19 was made on the magnetic head suspension in order to obtain the gain in the third torsion mode. In result, the gain in the third torsion mode was 13.1 dB.

Figure 22:
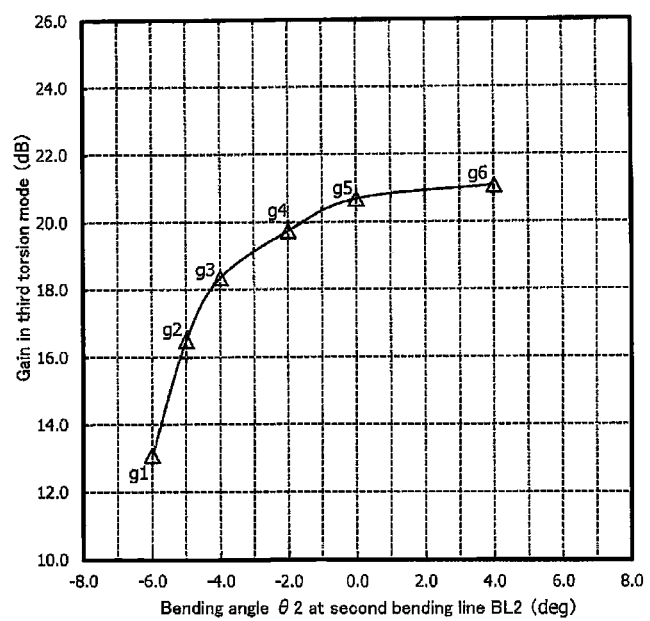
FIG. 22 is a graph showing the bending angle at the second bending line and the gain of the magnetic head slider in the third torsion mode.

This result is plotted in FIG. 22 in which the horizontal axis corresponds to the bending angle θ2 and the vertical axis corresponds to the gain in the third torsion mode ("g1" in FIG. 22).

The same analysis was made in a state where the bending angle θ2 was changed to −5 degrees.

In this case, the condition in which the bending angle θ1 was set to 2.73 degrees and the length D3 was set to 0.094 mm caused the setting height ZH to be 0.57 mm of the target setting height while minimizing the gains in the first and second torsion modes. In the magnetic head suspension having these dimensions, the gain in the third torsion mode was 16.5 dB. The result was also plotted in FIG. 22 ("g2" in FIG. 22).

The same analysis was made in a state where the bending angle θ2 was changed to −4 degrees.

In this case, the condition in which the bending angle θ1 was set to 2.81 degrees and the length D3 was set to 0.164 mm caused the setting height ZH to be 0.57 mm of the target setting height while minimizing the gains in the first and second torsion modes. In the magnetic head suspension having these dimensions, the gain in the third torsion mode was 18.4 dB. The result was also plotted in FIG. 22 ("g3" in FIG. 22).

The same analysis was made in a state where the bending angle θ2 was changed to −2 degrees.

In this case, the condition in which the bending angle θ1 was set to 2.60 degrees and the length D3 was set to 0.273 mm caused the setting height ZH to be 0.57 mm of the target setting height while minimizing the gains in the first and second torsion modes. In the magnetic head suspension having these dimensions, the gain in the third torsion mode was 19.7 dB. The result was also plotted in FIG. 22 ("g4" in FIG. 22).

The same analysis was made in a state where the bending angle θ2 was changed to 0 degrees (that is, in a state where no bending process was made at the second bending line BL2).

In this case, the condition in which the bending angle θ1 was set to 2.51 degrees and the length D3 was set to 0.316 mm caused the setting height ZH to be 0.57 mm of the target setting height while minimizing the gains in the first and second torsion modes. In the magnetic head suspension having these dimensions, the gain in the third torsion mode was 20.7 dB. The result was also plotted in FIG. 22 ("g5" in FIG. 22).

The same analysis was made in a state where the bending angle θ2 was changed to 4 degrees.

In this case, the condition in which the bending angle θ1 was set to 2.56 degrees and the length D3 was set to 0.364 mm caused the setting height ZH to be 0.57 mm of the target setting height while minimizing the gains in the first and second torsion modes. In the magnetic head suspension having these dimensions, the gain in the third torsion mode was 21.1 dB. The result was also plotted in FIG. 22 ("g6" in FIG. 22).

It is confirmed from FIG. 22 that, in the magnetic head suspension that is bent at the first bending line BL1 so as to be convex toward the disk surface (so that the distal side is separate from the disk surface) and is also bent at the third bending line BL3 so as to be convex toward the direction opposite from the disk surface (so that distal side comes closer to the disk surface), the gain in the third torsion mode becomes smaller as the bending angle θ2 at the second bending line is made larger in minus or negative direction (which means the direction causing the distal side to come closer to the disk surface).

The invention claimed is:

1. A magnetic head suspension comprising a supporting part that is swung around a swing center in a seek direction parallel to a disk surface directly or indirectly by an actuator, a load bending part including paired right and left leaf springs that are connected at proximal portions to the supporting part so as to generate a load for pressing a magnetic head slider toward the disk surface, a load beam part that is supported through the load bending part by the supporting part and transmits the load to the magnetic head slider, and a flexure part that is supported by the load beam part and the supporting part and has at a distal side a head-mounting region for supporting the magnetic head slider, wherein the load beam part includes a plate-like main body portion and paired flange portions, the main body portion facing the disk surface and formed with a dimple that protrudes in a direction toward the disk surface so as to be brought into contact with a rear surface of the head-mounting region that is opposite from a supporting surface at which the magnetic head slider is supported, the paired flange portions being bent from both side edges of the main body portion in a suspension width direction and existing at least in a region that is positioned closer to a distal side in the suspension longitudinal direction than a proximal region that is within 0.22*L1 from the distal edge of the supporting part provided that a distance in the suspension longitudinal direction between the distal edge and the dimple is represented by L1, wherein the load beam part is bent around two bending lines including a first bending line that is along the suspension width direction and is positioned within a center region away from the distal edge of the supporting part by more than or equal to 0.4*L1 and less than or equal to 0.6*L1 and a second bending line that is along the suspension width direction and is positioned closer to a proximal side in the suspension longitudinal direction than the first bending line, wherein the paired leaf springs are bent around a third bending line that is along the suspension width direction and is positioned between proximal edges connected to the supporting part and distal edges connected to the load beam part, and wherein the second bending line is positioned within the proximal region of the load beam part, and the paired flange portions does not exist at an area at which the second bending line is positioned.

2. A magnetic head suspension according to claim 1, wherein the load beam part does not include the paired flange portions within the proximal region.

3. A magnetic head suspension according to claim 1, wherein the load beam part includes paired right and left width-expanded portions that are positioned closer to the proximal side in the suspension longitudinal direction than the second bending line and extend outward from the main body portion in the suspension width direction.

4. A magnetic head suspension according to claim 1, wherein the paired flange portions includes distal-side flange portions arranged in a region closer to the distal side in the suspension longitudinal direction than the proximal region and proximal-side flange portions arranged in a region closer to the proximal side in the suspension longitudinal direction than the second bending line.

5. A magnetic head suspension according to claim 1, wherein the main body portion includes a bending-facilitated structure on the second bending line.

6. A magnetic head suspension according to claim 1, further comprising a damper fixed to a surface of the main body portion that is opposite from the disk surface, wherein the damper extends from a position that is closer to the proximal side in the suspension longitudinal direction than the first bending line until a position that is closer to the proximal side in the suspension longitudinal direction than the second bending line.

7. A magnetic head suspension according to claim 1, wherein provided that a length in the suspension longitudinal direction between the distal edge of the supporting part and the proximal edges of the paired flange portions is represented by L2 and a length in the suspension longitudinal direction between the distal edge of the supporting part and the second bending line is represented by D2, the second bending line is positioned so as to satisfy a condition of $0.7*L2 \leqq D2 \leqq 1.0*L2$.

8. A magnetic head suspension according to claim 7, wherein the second bending line is positioned so as to satisfy a condition of $D2=L2$.

9. A magnetic head suspension according to claim 1,
wherein the main body portion and the flexure part are overlapped with each other in such a manner as that, out of the main body portion, an area that is disposed at the same position as the second bending line in the suspension longitudinal direction includes an overlapped area that is overlapped with the flexure part and a non-overlapped area that is not overlapped with the flexure part, and
wherein the overlapped area is formed with a through hole penetrating in a direction orthogonal to the disk surface so that the second bending line is arranged only at the non-overlapped area.

10. A magnetic head suspension according to claim 1, wherein the suspension is bent at the first bending line so as to be convex toward the disk surface, and is also bent at the second and third bending lines so as to be convex toward a direction opposite from the disk surface.

* * * * *